(12) United States Patent
Van Der Net

(10) Patent No.: US 11,028,274 B2
(45) Date of Patent: Jun. 8, 2021

(54) METHOD FOR PREVENTING HARDENER COMPOUNDS TO BE FORMED FROM HARDENER PRECURSORS AND EXTENDING SHELF LIFE OF THE DISPERSION

(71) Applicant: Wisespray International Ltd, Helsinki (FI)

(72) Inventor: Hendrik Van Der Net, Scharnegoutum (NL)

(73) Assignee: Wisespray International Ltd, Helsinki (FI)

( * ) Notice: Subject to any disclaimer, the term of this patent is extended or adjusted under 35 U.S.C. 154(b) by 0 days.

(21) Appl. No.: 16/619,484

(22) PCT Filed: Jun. 11, 2018

(86) PCT No.: PCT/FI2018/050437
§ 371 (c)(1),
(2) Date: Dec. 5, 2019

(87) PCT Pub. No.: WO2018/224737
PCT Pub. Date: Dec. 13, 2018

(65) Prior Publication Data
US 2020/0190338 A1    Jun. 18, 2020

(30) Foreign Application Priority Data
Jun. 9, 2017    (FI) ...................... 20175535

(51) Int. Cl.
*C09D 175/04* (2006.01)
*C09D 5/02* (2006.01)

(52) U.S. Cl.
CPC ........... *C09D 5/021* (2013.01); *C09D 175/04* (2013.01)

(58) Field of Classification Search
CPC ................ C09D 5/021; C09D 175/04
USPC ........................................ 524/775
See application file for complete search history.

(56) References Cited

U.S. PATENT DOCUMENTS

| 7,338,226 B2 | 3/2008 | Kwasny |
| 2001/0014700 A1 | 8/2001 | Kwasny |
| 2009/0281253 A1 | 11/2009 | Okamoto et al. |
| 2013/0005885 A1 | 1/2013 | Sunayama et al. |

FOREIGN PATENT DOCUMENTS

| EP | 1125997 A1 | | 8/2001 |
| JP | H0841155 A | | 2/1996 |
| JP | 2004035947 A | * | 2/2004 |
| JP | 2004035947 A | | 2/2004 |
| WO | 2017/098080 A1 | | 6/2017 |

* cited by examiner

*Primary Examiner* — Kelechi C Egwim
(74) *Attorney, Agent, or Firm* — Meunier Carlin & Curfman LLC

(57) ABSTRACT

A method is disclosed for preventing hardener compounds to be formed from hardener precursors in a sealed and pressurized aerosol can. This includes a paint forming dispersion containing after sealing the can a liquefied propellant, epoxy or/and polyurethane resins amount W1, hardener precursor of the epoxy or/and polyurethane resins amount W3, where the epoxy or urethane hardener precursors are selected from a group including an imine, an enamine, a Mannich base, a Schiff's base, an oxazolidine, an aldimine and mixtures thereof, free water of amount W1 in a range of 1-10000 ppm, and brought into the can alongside with the other paint dispersion forming chemicals before sealing the can. A catalytic compound prevents formation of the epoxy or/and polyurethane hardener amines from the epoxy or/and polyurethane hardener precursors:

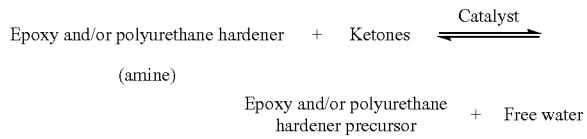

38 Claims, No Drawings

METHOD FOR PREVENTING HARDENER COMPOUNDS TO BE FORMED FROM HARDENER PRECURSORS AND EXTENDING SHELF LIFE OF THE DISPERSION

PRIORITY

This application is a U.S. national application of the international application number PCT/FI2018/050437 filed on Jun. 11, 2018 and claiming priority of Finnish application 20175535 filed on Jun. 9, 2017 the contents of all of which are incorporated herein by reference.

FIELD OF THE INVENTION

The invention relates to a method for preventing polyurethane hardener compounds to be formed from hardener precursors and extending shelf life of the dispersion in a sealed and pressurized aerosol can.

The invention relates also to a method for preparing dispersion in the sealed can said dispersion having an extended shelf life.

The paint forming, pressurized dispersion in a sealed aerosol can said dispersion having an extended shelf life, The invention further relates paint forming, pressurized dispersion in a sealed aerosol can wherein a reaction takes place which extends the shelf-life of the dispersion.

BACKGROUND ART

A variety of aerosol formulations for aerosol paint and adhesive systems, packed in cans have been known for years. One-component aerosol paint and adhesive formulations have been the most important ones, but two-component paint and adhesive systems composing of two-component paint or adhesive formulations have been gaining more importance in the last few years.

The one-component aerosol formulations are suitable for use in conventional aerosol cans, that is, in aerosol cans having only one chamber. The two-component aerosol formulations are usually suitable only for aerosol cans having at least two chambers.

Two-component aerosol paint and adhesive systems comprise a binder, a curing component such as hardener or cross-linking component, a propellant and optionally a solvent in an aerosol can. The binder and the hardener are typically packed in separate chambers in the aerosol can. These types of aerosol cans are also referred to as "can in a can" cans or "2-chamber" cans. Just before using the can one of the chambers is punctured so that the binder and the hardener are brought into contact with each other inside the can. Reaction between the binder and hardener starts immediately when they are contacted in the can and the aerosol formulation is ready to be used for spraying.

Polyurethane system is one example of a two-component aerosol paint system. The two-component polyurethane aerosol formulation comprises a binder component, a hydroxyl group containing acrylate or polyester resin, and a polyisocyanate as curing component in a separate chamber. Aerosol paint cans of this type are employed to apply primers, undercoats, finishing coats, etc., primarily for vehicles such as passenger cars, trucks, busses, railroads, and containers.

EP 1125997 B1 discloses an aerosol formulation for two-component aerosol paint system in cans. The paint material, which consists of acrylic resins containing hydroxyl groups, and the hardener, which consists of aliphatic polyisocyanates are filled in two separate chambers within an aerosol can and united only immediately prior to their application. The components are jointly sprayed from the aerosol can via propellant gas consisting of a propane/butane mixture.

An epoxy system is another example of a two-component aerosol paint and adhesive system. The epoxy system comprises an epoxy resin parent compound as binder and usually an amine as hardener. The two-component epoxy systems are used, additionally to automotive purposes, for general industrial and household industrial purposes, for building sector, machinery construction industry etc. For example, EP 1427767 B1 discloses a two-component aerosol paint and adhesive system packed in a can with an epoxy paint and adhesive system especially suited for repair purposes. The aerosol paint and adhesive system in an aerosol can contains an aerosol formulation based on two-component epoxy technology comprising (i) a parent epoxy resin, (ii) a solvent mixture, (iii) a propellant gas, and (iv) an epoxy curing agent in a separate chamber to be used as hardening constituent for the parent epoxy resin.

In the known two-component aerosol paint and adhesive systems the binder and the hardener are placed in separate chambers within an aerosol can so that reaction between the binder and hardener is not possible. As soon as the binder and hardener are brought into contact by puncturing one of the chambers, hardening reaction starts immediately in aerosol formulation. Therefore this kind of aerosol formulations should be used entirely at once because the hardening reaction starts already inside the can. Shelf life of such two-component aerosol paint and adhesive systems is limited to maximum of 2-3 days after the first use. Additionally, the 2-chamber aerosol cans are complicated and expensive to manufacture.

Epoxy resin or polyurethane resin based paint and adhesive systems, utilizing one compartment i.e. single chamber cans are available, as well. In these systems the individual reactive components, that is said epoxy or polyurethane resins and their curing precursors are in latent form before taking the can into use. However, there are two main drawbacks in these solutions; either they do not tolerate moisture at all which leads easily to a limited shelf-life or alternatively good quality paints cannot be prepared from them.

The latter drawback is due to fact that, to assure the stability of total mixture of an aerosol in a can these aerosols known from prior art contain so much dry or liquid water scavengers, that they will completely change the structure and quality of the coating to be made from these aerosol formulations. Water scavengers are not paint related material but will affect for instance the gloss and adhesion of the paint surface and therefore they are used for example as fillers in a primer.

In the prior art these solid and liquid water scavengers are used to block the effect of the ambient moisture in epoxy resin based paint and adhesive formulas by affecting the ketone-imine balance and thus formation of (epoxy) hardener compounds (amines) in reactions (1a-1c):

(1a)

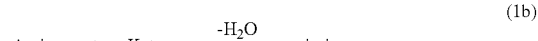
(1b)

Which can also be presented as a reversible reaction equilibrium:

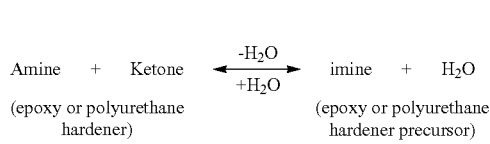

(1c)

By removing water from the right side of the hydrolyzing reaction (1a) or by removing water from eliminating stage in condensing reaction (1b) with water scavengers, one can either prevent the amines (epoxy or polyurethane hardener compounds) to be formed in reaction (1a) or to shift reaction equilibrium (1b) to favor forming imines (epoxy or polyurethane hardener precursors) instead of amines (epoxy or polyurethane hardeners).

In the prior art the inventors have added big amounts of water scavengers to control the formation of epoxy or polyurethane hardeners in the above mentioned reaction (1a) between imine and water. Removing water with scavengers also shifts reaction (1b) into formation of more imines. The amount of water scavengers used to control reactions 1a and 1b have been so high that it has deteriorated the quality of coating to be achieved. Use of water scavengers will tend to prevent making high quality paints because surface of paint film will remain soft or brittle and making a clear coat high gloss or a colour high gloss is also impossible if high amount of water scavengers are used in an aerosol formulation to control formation of epoxy hardeners. Therefore, good quality paints cannot be prepared from these known one-can-two-component-aerosol-formulation(s).

For example, the abstract of JP2004035947 discloses a two component aerosol formulation for an aerosol can. The formulation comprises an epoxy resin such as bisphenol A type, an imine as hardener precursor and a propellant. The drawback and challenge in this type of solution is typically the presence of moisture in the aerosol formulation causing premature hardening already in the can. Therefore, zero ambient moisture for the precursors and the packaging ambient is a key requirement. Additionally, in this patent document it has been proposed that ensuring the dry conditions should be done by adding water scavengers. As mentioned above adding water scavengers will prevent forming hardener compounds prematurely because it will affect to imine-keton balance in reactions (2a) and (2b). However, the addition of water scavengers will affect negatively to paint quality and therefore the primary use of the disclosed two component aerosol of this kind is as a primer with gloss <5.

Patent document JP2004035947 discloses also an epoxy resin based two component aerosol formulation, which can be used in an aerosol can, wherein the epoxy resin and a hardener are mixed extended time in the same room of the aerosol can before manufacturing the paint or lacquer. However, also this patent document uses water scavengers to remove excess water from aerosol. These scavengers will make it impossible to achieve commercial 2K paints with high gloss and therefore this two component aerosol is suitable only to making primers.

DESCRIPTION OF THE INVENTION

The target of the present invention was to remove drawbacks of the prior art mentioned above.

Based on the above presented prior art there was a general need for a polyurethane based two-component aerosol paint and adhesive system wherein an extended shelf life could be achieved without relying on the use of water scavengers, especially solid water scavengers whose use have proven problematic.

The first main object of the present invention was to provide a polyurethane resin based aerosol dispersion, such as paint and adhesive system, that has a good stability and a long shelf life in a sealed aerosol can.

Especially object of the present invention was to provide an aerosol dispersion in a sealed and pressurized aerosol can, which would be stable for a long time period and which would enable successful reuse after initial first usage anytime within at least a year, preferable at least three years.

The second main object of the present invention was to control reaction equilibrium between t the polyurethane hardener precursors and polyurethane hardeners (amines) presented in reactions 1a-1c, so that it will also enable making high quality paints and primers.

This second objective means that the objective of the present invention was to prevent polyurethane hardener compounds to be formed from polyurethane precursor in the polyurethane based two-component aerosol paint and adhesive system, without affecting negatively to the quality of the paint to be manufactured from said aerosol formulation.

This second main objective means also that method to be used should enable making a wide range of paints with high gloss, lacquers or varnishes with high transparency, adhesives and primers with good adhesion and paints with good surface hardness and resistance to corrosion. In this connection should be noted that especially solid water scavengers will reduce the corrosion resistance; primers cannot be used as surface paints, because they include fillers (solid water scavengers) and a primer film will thus pass water. In a case an epoxy paint contains solid water scavengers, the water can remain inside the epoxy paint when the paint film is formed. This can cause corrosion problems.

The present invention provides a method for preventing hardener compounds to be formed from hardener precursors and extending the shelf life of the dispersion in the sealed can as depicted by claims 1 and 2, the method for preparing said dispersion into the sealed can as depicted in claims 15 and 16 and also a paint forming, pressurized dispersion in a sealed aerosol as depicted by claim 24.

This inventive two-component aerosol paint and adhesive system have a long shelf life, is simple to manufacture and use, can be reused, does not harden prematurely due to ambient moisture and will enable making high quality paints.

To be more accurate the present method relate a method for preventing hardener compounds to be formed from hardener precursors and extending shelf life of the dispersion in a sealed and pressurized aerosol can comprising a paint forming dispersion which contains immediately after sealing the can liquefied propellant, polyurethane based resins amount W2, hardener precursor of polyurethane resins amount W3 wherein urethane hardener precursors are selected from the group comprising of an imine, an enamine, a Mannich base, a Schiff's base, an azole preferable an oxazole such as an oxazolidine and an aldimine and mixtures thereof, free water of amount W1, which amount W1 is in the range of 1-10000 ppm preferable 1-6000 ppm, and brought into said can alongside with said other paint dispersion forming chemicals before sealing the can. In said method polyurethane resins are selected from the group which composes of MDI, HDI, IPDI, TDI and phenol blocked TDI prepolymers, the dispersion solution contains also ketones, and a weak acid, as a catalyst, to prevent formation of polyurethane hardener amines from polyurethane hardener precursors, the amount of said weak acid in adapted so, that it catalyses the reaction (2; 2a1) shifting the equilibrium of the reversible reaction (2a; 2a1), in alternative pathways A or B, between the free water present in said dispersion and polyurethane hardener precursor back to formation of said initial polyurethane hardener precursors:

A)

$$\text{Polyurethane hardener} + \text{ketone} \underset{\text{Weak acid}}{\rightleftarrows} \text{Polyurethane hardener precursor} + \text{H}_2\text{O (free water)} \quad (2a: 2a1)$$

or $$\text{Azole} + \text{H}_2\text{O} \longrightarrow \text{Polyurethane hardener precursor} \quad (2b)$$

B)

$$\text{Polyurethane hardener} + \text{ketone} \underset{\text{Weak acid}}{\rightleftarrows} \text{Polyurethane hardener precursor} + \text{H}_2\text{O (free water)} \quad (2a; 2a1)$$

wherein said polyurethane hardener is a compound with at least an amine and possible also a hydroxyl functionality and wherein said reversible reaction (2; 2a1) takes place during the entire retention time of the dispersion in the sealed can, so that the amount of free water (W1) is unchanged and remains between 1-10000 ppm between two successive uses of the can.

The invention relates also to method for preventing hardener compounds to be formed from hardener precursors and extending shelf life of the dispersion in a sealed and pressurized aerosol can comprising a paint forming dispersion which contains after sealing the can: liquefied propellant, polyurethane resins of an amount W2 epoxy resins of an amount W4, hardener precursor of an amount W3 of said polyurethane resins and hardener precursors of said epoxy resins of an amount W5, wherein said polyurethane hardener precursors and epoxy hardener precursors are selected from the group comprising of an imine, an enamine, a Mannich base, a Schiff's base, an azole preferable oxazole such as an oxazolidine, an aldimine and mixtures thereof, free water of amount W1, which amount W1 is in the range of 1-10000 ppm, preferable 1-6000 ppm, and brought into said can alongside with said other paint dispersion forming chemicals before sealing the can. In said method polyurethane resins are selected from the group which composes of MDI, HDI, IPDI, TDI and phenol blocked TDI prepolymers, the dispersion contains also ketones and a weak acid, as a catalyst, to prevent formation of the polyurethane hardeners from said polyurethane hardener precursors and to prevent also formation of the epoxy hardeners from said epoxy hardener precursors, wherein said polyurethane hardener is a compound with at least amine and possible also a hydroxyl functionality and epoxy hardener is a compound with amine functionality, the amount of said weak acid is adjusted, that it catalyses the reaction (2; 2a2), by shifting the equilibrium of reversible reaction (2; 2a2) between the free water present in said dispersion and polyurethane hardener and epoxy hardener back to formation of said initial polyurethane hardener precursors and epoxy hardener precursors:

A)

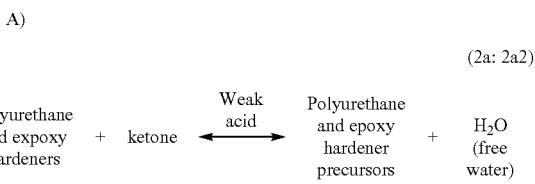

(2a: 2a2)

or

B)

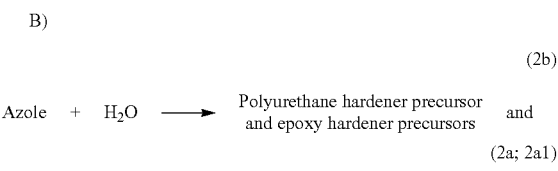

(2b)

and

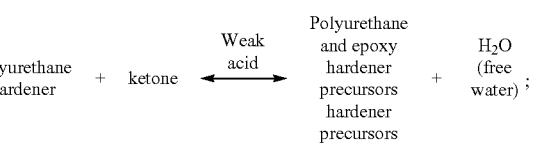

(2a; 2a1)

wherein said reversible reaction (2a; 2a2) takes place during the entire retention time of the dispersion in the sealed can so that the amount of free water is unchanged and remains between 1-10000 ppm between two successive uses of the can.

The invention relates also the method for preparing the dispersion having an extending shelf life in the sealed can which method comprises forming a paint forming dispersion from the paint forming chemicals which contain polyurethane resins and the polyurethane hardener precursors; weak acid, ketone(s) and a possible organic solvent by mixing the compounds and directing the obtained mixture into an aerosol can, and providing the propellant into the can and sealing the can or sealing the can and directing said paint forming chemical(s) into the can before or after sealing the can separately or in combination with each other, and providing the propellant into the can after sealing the can;

wherein alongside of said chemicals present in paint making dispersion is brought into said can also free water the amount W1 which amount W1 is in the range of 1-10000 ppm. The prepared dispersion in the can comprises a weak acid as a catalyst to prevent the formation of the polyurethane hardener amines from said polyurethane hardener precursors, The invention also relates to a method for extending the shelf life of the dispersion prepared in the sealed can, wherein the method additionally comprises adding the polyurethane resin and the polyurethane hardener precursor into separate sealable compartment inside the can; adding a weak acid and a possible solvent inside the can; and providing the propellant inside the can; sealing the can; and mixing together paint forming chemicals, weak acid and a possible solvent inside a same room of the can for making the dispersion wherein alongside of said chemicals present in paint making dispersion is brought into said can also free water the amount W1 which amount W1 is in the range of 1-10000 ppm. In said method the weak acid prevents the formation of the polyurethane hardener amines from said polyurethane hardener precursors, by shifting the equilibrium of the reversible reaction (2a; 2a1) between the free water present in said dispersion and polyurethane hardener precursor back to formation of said initial polyurethane hardener precursor:

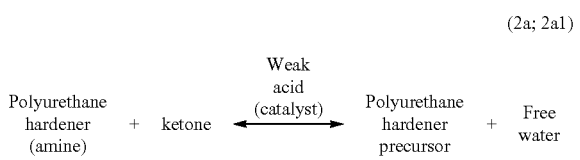

(2a; 2a1)

wherein said reversible reaction (2a) takes place during the entire retention time of the dispersion in the sealed can.

The invention also relates to a paint forming, pressurized dispersion in a sealed aerosol can and with an extended shelf life, wherein said dispersion have been prepared either by a) providing a paint forming dispersion by mixing a polyurethane resin and polyurethane hardener precursor and admixing possible organic solvent, pigments and additives; directing said mixture into an aerosol can; providing the propellant into said can; providing alongside with said paint forming chemicals additionally 1-10000 ppm of free water into said can; sealing the can;

or by b) providing a paint forming dispersion by adding a polyurethane resin and a polyurethane hardener precursor, possible organic solvent and pigments and additives into an aerosol can; and providing the propellant into said can; providing alongside with said paint forming chemicals additionally 1-10000 ppm of free water into said can; sealing the can; combining said paint forming chemicals inside the can with each other to form a paint forming dispersion; wherein said sealing of the can is made before or after of adding a dispersion forming chemical(s) into the can. Polyurethane resins are selected from the group which composes of MDI, HDI, IPDI, TDI and phenol blocked TDI pre-polymers, d) polyurethane hardener precursors, are selected from the group consisting of an imine, an enamine, a Mannich base, a Schiff's base, aldimine, oxazolidine and mixtures thereof. In said dispersion for extending the shelf life of the dispersion, a catalytic amount of weak acid is also brought into the solution of paint forming chemicals before sealing the can, which weak acid is selected from the group which have the $pK_a$ value in the range from 1.2 to 9.9 preferably 1.2-5.2 the amount of the weak acid being in the range of 0.01-10% by weight (w/w) of the aerosol formulation, preferably from 0.1 to 5%, still more preferably from 0.25 to 2%;

weak acid catalyzes a reversible reaction (2a) between the free water present in said dispersion and polyurethane and possible epoxy hardener precursor taking place during the entire retention time of the dispersion in the sealed can:

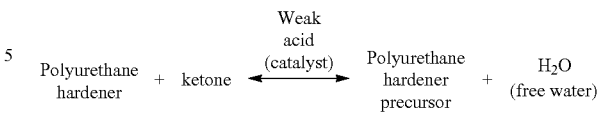

(2a; 2a1)

and provides the paint forming, pressurized dispersion hydrolyzed products of said epoxy or polyurethane hardener precursors;

the amount of mentioned paint forming chemicals: polyurethane hardener precursors, polyurethane resin, free water, propellant, possible organic solvent and possible pigments is at least 95% w/w from the total volume of the paint forming solution and the rest of said solution composes of the possible additives.

In the preferred embodiment of the present invention the paint forming dispersion is provided by admixing alongside with the polyurethane resin and polyurethane hardener precursor also epoxy resins and epoxy hardener precursors in stage a) or b) and wherein said the weak acid catalyzes the reversible reaction (2a; 2a2) between the free water present in said dispersion and polyurethane and epoxy hardener precursors, wherein said epoxy hardener is a compound with amine functionality, said reaction (2a; 2a2) taking place during the entire retention time of the dispersion in the sealed can:

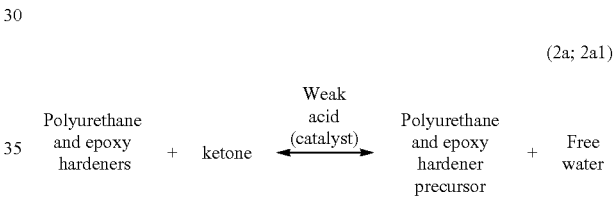

(2a; 2a1)

and provides the paint forming, pressurized dispersion hydrolyzed products of said polyurethane hardener precursors and epoxy hardener precursors.

In a method of the present invention said method further comprises spraying the aerosol dispersion out from the can to form a paint layer on the target surface. This paint layer is dry after and have following properties.

In another preferred method of the present invention said method further comprises reusing of the aerosol dispersion comprising the mixture of paint forming chemicals comprising a polyurethane resin and a polyurethane hardener precursor; a weak acid and a possible solvent after storing said mixture an extended time period of 0.5-3 years. During the entire retention time of said dispersion reversible reaction (2a) prevents the formation of polyurethane hardener amines from said polyurethane hardener precursors. This keeps the amount W1 of free water and the amount W2 of said polyurethane resins and the amount W3 of said hardener precursor of said polyurethane resins constant, that is unchanged between two successive uses.

The invention relates also a paint forming dispersion inside the closed aerosol can between two uses of said paint forming dispersion. The amount of free water W1, the amount of polyurethane resins W2 and the amount of said hardener precursor W3 of said polyurethane resins are constant, unchanged between these two uses. The amount of W1 is in the range of 1-10000 ppm, preferably 1-6000 ppm.

The reversible reaction 2a takes always place between two successive uses of paint dispersion.

As used herein, the term free water refers to molecular water present in the formulation that is available to react with other component in the formulation. This includes, but is not limited to, water dissolved in the paint dispersion or in the gaseous portion of the aerosol can. The term "free water" excludes water that is not available for reactions such as water bound to e.g. inorganic salts (as hydrates) or water sequestered in e.g. molecular sieves or other desiccants or water scavengers.

As used herein, the term water scavenger refers to a substance or chemical compound that has the ability to remove free water from the composition. The water scavenger may either be one that physically sequesters the water molecules within its structure such as molecular sieves or silica gel, or chemically reactive compounds that bind the water in a chemical reaction that produces one or more new chemical species.

Especially water scavengers to be excluded from the present invention are selected from the group zeolite, calcium carbide, activated carbon, silica, activated alumina, $CaSO_4$, CaO, metal alkoxides and clay. The use of these water scavengers is restricted so, that they comprise less than 1% w/w from the paint making dispersion in a sealed can.

The amount of solid water scavengers especially in epoxy paint forming dispersion should be so low, that all water present in said dispersion is free water. Free water will not cause problems, because it reacts with the water of air and then react with the latent epoxy and polyurethane hardeners. The rest of the free water will evaporate together with the solvents sometimes even forming an azeothrope.

The definition aerosol can means herein that inside the aerosol can there is a room wherein at least part of the epoxy or polyurethane resin based paint and adhesive system, such as epoxy resin or polyurethane resin and their hardener precursors, co-exist as a mixture for extended time period of storing.

The use of the can means spraying dispersion out of the can. Two successive uses of the can means spraying dispersion out of the can two times while there have been a specific time between these two uses (for example couple of hours or days or months).

The paint means herein, primer, undercoat, finishing coat, top coat, coloured top coat, varnish or lacquer.

In the present invention by a polyurethane hardener and a possible epoxy hardener is meant a chemical compound capable of acting as a hardener for a polyurethane resin and a possible epoxy resin such as an amine that is formed when the hardener precursor such as imine, enamine, aldimine, oxazolidine, Schiff's base and/or Mannich base reacts with water. The hardener to be used in the present invention should be able to react with at least the polyurethane resin and possible also with the epoxy resin present used for providing the desired coating layers i.e. paint or adhesive.

In the present invention by hardener precursor or more specifically polyurethane hardener precursor is meant a chemical compound capable of forming a polyurethane hardener i.e. a compound containing a suitable amine and/or hydroxyl group functionality.

In the present invention by a weak acid is meant an acid that dissociates incompletely, releasing only some of its hydrogen atoms into the solution.

Generally speaking, the present invention is based on amending the pathways of general reaction 2a without the use of excess amount of water scavengers which will affect negatively to many properties of the paint. This is done by creating in a sealed aerosol can a space where environmental circumstances are of zero influence and a weak acid is used to control the hydrolysis of the hardener precursors. This means that the content of the paint forming dispersion will be unchanged between two successive uses and specifically immediately after closing the can and using the can first time by spraying the paint forming dispersion out of the can.

The weak acid is not a part of any reaction but guarantees an environment which forces the preferred reaction between traces of water that might otherwise hydrolyze epoxy and polyurethane hardener precursors always react in the presence of a ketone so that the reactions 2a1 and 2a2 results back to initial imine, ketimine, aldimine, Mannich base, Schiff's base, oxazole such as bisoxazolidine, benzoxazolidine or oxazolidine. This is an ongoing loop which keeps the amount of reactants (water, latent hardener precursors and epoxy and/or polyurethane resins constant between uses of the can. Using weak acid catalyst instead of water scavengers to change reaction (1a) pathway, gives a possibility to create a complete new and different range of quality products. In the prior art use of water scavengers in changing the pathway or reaction (1a) has lead making low gloss products such as primers and corrosion protectors.

The weak acid is needed only as a catalyst in the present method and its amount to be added is estimated or determined on the basis of free water present in the sealed can.

Basically, the amount of weak acid should be at least of 1 mole weak acid to 1 mole of free water. My adjusting the amount of weak acid in this ways the weak acid can effectively catalyze the reaction 2a so that all hydrolyzed hardener precursors would be prevented to form amines. Rest amount of the carboxylic acid will function as a catalyst in the shiff's base to stay on the precursor side of the reaction 2a.

Additionally, in the reaction 2a one mole polyurethane hardener precursor will react with two moles of free water.

More specifically speaking, the present invention is based on preventing the overall reaction (2a) to proceed into formation of polyurethane hardener and possible epoxy hardener by using a catalyst that shift the reaction equilibrium of reaction 2a to favor formation of initial imines or corresponding compounds instead of hardener amines. If the catalyst is a weak acid, it will create a weak acid environment which shifts the reaction equilibrium of reaction 1c to favor formation of initial imines or corresponding initial latent hardener precursor compounds. Thus the present invention is based on the surprising finding that a stable aerosol solution comprising polyurethane resin and polyurethane hardener precursor, can be prepared and packed into a same room of a conventional aerosol can if a catalyst compound, preferably a weak acid is also added into same room of the can. Adding said catalyst will create a stable chemical environment inside the aerosol can. If the catalyst compound is a weak acid, it will create a stable weak acid environment inside the can. This stable environment will enable making a stable solution inside the can, in which the amount of any component does not have changes between uses of the can when retaining said can extended time. When this stable environment is in place in a can it will prevent curing of epoxy or polyurethane resin. This curing reaction is prevented by creating an ongoing reaction which will prevent amine hardening compounds to be formed from imine or more generally from Schiff's bases.

Adding a catalytic amount of weak acid which has the $pK_a$ value in the range from 1.2 to 9.9, preferable from 1.2 to 5.2, enables formulation components to contain minor amounts of water originating from the transport, preparation or handling of the chemicals and containers. The weak acid is selected so, that it will efficiently maintain the equilibrium of the formulation at the hardener precursor's side even at the presence of minor amounts of water.

Thus, the effect of free water into formation of amines (a polyurethane hardener compound) from mentioned polyurethane hardener precursors is controlled totally by using a weak acid as a catalyst to force the balance reaction (1c) to proceed via pathway of reaction 2a without removing the water created in the condensation reaction between ketone and amine. In a case the hardener precursor is an imine, the presence of weak acid favors the formation of initial imines instead of amines when ketone and water are present. This same basic principle will allow more water to be present in said aerosol formulation without amine hardener compounds for polyurethane to be formed from its hardener precursors. Hardener precursor for polyurethane can be also aldimine, enamine, oxazole, preferable oxazolidine or bisoxazolidine, Schiff's base or Mannich bases instead of imine.

In a case the polyurethane hardener precursor is imine, the reversible hardener precursor reaction with water results an amine and a ketone. However, in the presence of catalytic amount of weak acid such as carboxylic acid, this reaction is shifted to favor the formation of initial imines (+water) instead of amines, thus preventing formation of amine hardeners of epoxy resin as follows:

$$\text{Amine (polyurethane hardener)} + \text{ketone} \underset{\text{Weak acid (catalyst)}}{\rightleftharpoons} \text{Imine (polyurethane hardener precursor)} + \text{H}_2\text{O (free water)} \quad (2a: 2a1)$$

As said before a weak acid is an acid that dissociates incompletely, releasing only some of its hydrogen atoms into the solution.

Thus, it is less capable than a strong acid of donating protons. Weak acids ionize in water solution only to a moderate extent. If the weak acid is represented by the general formula HA, then in an aqueous solution a significant amount of undissociated HA still remains. Weak acids dissociate in water in the following way:

$$HA_{(aq)} \rightleftharpoons H^+_{(aq)} + A^-_{(aq)}$$

The strength of a weak acid may be represented by an equilibrium constant or percentage of dissociation. The equilibrium concentrations of reactants and products are related by the acid dissociation constant, $K_a$:

$$K_a = \frac{[H^+][A^-]}{[HA]}$$

The greater the value of $K_a$, the more the formation of H+ is favored, and the lower the pH of the solution. The $K_a$ of weak acids typically varies between 1.8×10−16 and 55.5. For many practical purposes it is more convenient to discuss using the logarithmic constant, $pK_a$ $$pK_a = -\log_{10} K_a$$

A weak acid typically has a $pK_a$ value within the approximate range from −2 to 12 in water.

In the present invention the weak acid is selected from the group which has the dissociation constant $pK_a$ value in the range from 1.2 to 9.9, preferably from 1.2 to 5.2.

The prepared aerosol dispersion contains preferably a catalytic amount of weak acid which is from 0.1 to 10% by weight (w/w) of the aerosol dispersion, preferably from 0.1 to 5%, more preferably from 0.25 to 2%.

Preferably, all components of the aerosol formulation can be placed within a common single chamber in an aerosol can without the components essentially reacting with each other during storing.

It is important to keep the amount of the weak acid so small that it will not have any negative influence on the quality of the coating. The weak acid is needed only a catalytic amount in the present method. This catalytic amount of a weak acid means that there is 0.1 to 10% of weak acid by weight (w/w) of the aerosol dispersion, preferably from 0.1 to 5%, more preferably from 0.25 to 2% of weak acid by weight (w/w) of the aerosol dispersion.

In a preferable embodiment of the present invention the weak acid is added into paint forming dispersion an amount that will contribute to a higher adhesion to the paint surface by etching.

The use of catalytic amount of weak acid in the present method and the aerosol dispersion used in this method enables making high quality paints regardless if all it is used at once or reused after an extended time period The dry paint film (undercoat, finishing coat or lacquer) prepared from said mixture should have gloss in the range of 10-100 preferable over 90, under an angle of 60°.

The dry paint film prepared from said mixture should have the König-hardness over 40 after 10 h and over 100 after 120 h of drying-time, measured with pendel hardness meter.

The dry paint film prepared from said mixture should have the adhesion >450 psi, in PosiTest.

The aerosol formulation may even be prepared under ambient conditions without any particular need for pre-drying the components of aerosol formulation before packing them into aerosol can or operating under inert gas, such as nitrogen, atmosphere while preparing the formulation from its components or filling the can. Even technical grade or industrial quality components comprising hardener precursors may be used although they provide water into the formulation inside the can.

The stable mixture of the polyurethane resin and the polyurethane precursor and the weak acid, together with at least one propellant, is packed as an aerosol dispersion into a conventional one-chamber aerosol can. As the aerosol formulation comprising polyurethane resins and hardener precursor is sprayed from the can, a cloud of fine particles suspended in gas or air is formed picking up water (moisture) from the air. The absorbance of water will have an effect on the hardener precursor, such as oxazole, preferable oxazolidine or bisoxazolidine, imine, enamine, aldimine and/or Mannich base or Schiff's base compound. With the relatively overload of water present in the atmospheric air, the hardener precursor will hydrolyze and form a compound having amine and/or hydroxyl functionality(ties) which will react with the polyurethane resin an a possible epoxy resin and create a cross linking film. Together with the other paint/adhesive related ingredient this will form the eventual end product (paint) which can be an adhesive, a colored top coat, a varnish, lacquer, a primer or a clear coat.

As the reaction between the amine compound and/or hydroxyl compound and the polyurethane resin and the possible epoxy group occurs outside of the aerosol can, the formulation inside the can stays stable. No additional moisture from the air gets inside the can, because pressure inside the can is greater than the pressure outside of the can. Compared to prior art wherein a kind of stable environment is achieved after removing water, this kind of moisture control method have a definitive advantage of being able to withstand moisture variations.

There is also another significant advantage since the curing reaction begins only when the dispersion is sprayed outside of the sealed can; the surface quality of the paint will be better compared to prior art 2 compartment 2K-products wherein curing begins already in the can after puncturing said compartments so that their content is mixed (at least the hardener and the hardener precursor).

As the formulation stays stable inside the can, only a desired portion of the two-component aerosol formulation may be used at a time. That is, the whole formulation does not have to be used at once, since the formulation remains stable inside the can due to reaction 2a in which hydrolyzed products of hardener precursors will not proceed into formation of hardener amines but back to forming original hardener precursors.

Shelf life of the can containing the formulation is at least a year, possibly up to 3 years or even more. Moreover, an aerosol can containing the formulation is easier and faster to use, because there is no need to first separately mix the hardener and the binder as is the case with known solutions.

The preparation of the formulation and can containing the formulation is essentially simplified as no protection gas or pre-drying steps are necessary. The manufacturing can take place in ambient conditions using regular mixing and can filling techniques.

By ambient is meant the typical environmental conditions, temperature, pressure and humidity, prevailing at the point of preparation of the formulation at regular industrial surroundings.

In one aspect, the present invention provides a two-component aerosol formulation suitable for use in an aerosol can, such as in a single chamber aerosol can. Naturally, also multiple chamber cans can be used, in a case paint forming chemicals, comprising epoxy resin and a hardener precursor,
  a weak acid and a possible solvent for obtaining a mixture;
  the components are brought into contact with each other once taking the can into use.

More particularly, the present invention provides a two-component aerosol dispersion containing paint forming chemicals comprising at least one polyurethane resin and at least one hardener precursor, and at least one propellant. The formulation further contains at least a portion of a weak acid having the $pK_a$ value in the range from 1.2 to 5.2.

In one embodiment the weak acid is selected from those having $pK_a$ value within the range from 3 to 5, for efficiently maintaining the equilibrium of the formulation at the hardener precursor's side.

In another embodiment the weak acid is selected from those having the $pK_a$ value within the range from 4.2 to 4.9 for optimized stability in storage and performance in use.

Naturally, the type of weak acid has a further influence on the formulation properties, as well as the amount of weak acid used.

In the dispersion of the present invention, the polyurethane resin does not substantially react with the hardener precursor or with the weak acid of the aerosol dispersion.

The aerosol dispersion of the present invention comprises at least one latent hardener precursor which is selected from the group consisting of an imine, an enamine, an oxazolidine, a Mannich base, a Schiff's base, aldimine and mixtures thereof.

In a preferred embodiment of the present invention, by selecting a proper latent hardener precursor one is able to choose the drying time of the paint surface between 5-90 minutes.

The imine which can also be a Schiff's base, enamine, aldimine, oxazolidine, or Mannich base does not substantially react with polyurethane resin and the possible epoxy resin as such, when no water is present, for example inside a dry aerosol can atmosphere. As soon as the imine, enamine, aldimine, oxazolidine and/or Mannich, Schiff's base are in contact with water, the water reacts with the hardener precursor, and as a result of this reaction an amine reactant is formed. Subsequently, the formed amine compound functions as hardener and reacts with the epoxy resin providing the coating.

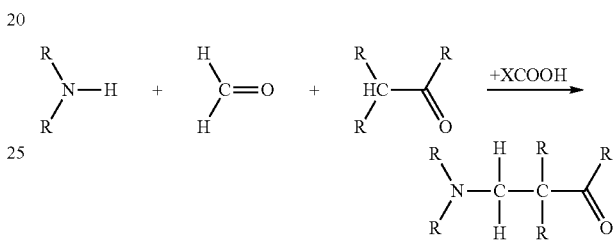

When the two-component aerosol formulation of the present invention is sprayed from an aerosol can, a cloud of particles suspended in gas or air is formed effectively picking up moisture from the air due to large surface area. The moisture or water will react with the hardener precursor of the formulation forming the amine compound (a hardener). The formed amine compound reacts further with the epoxy resin. This reaction is also referred to as curing reaction. And, finally a coating or adhesive layer is formed on a substrate on which the formulation is sprayed.

FIG. 1 presents, as an example, the reversible reaction of an imine with water resulting in an amine and a ketone:

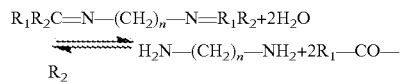

FIG. 2 presents, as an example, the reversible reaction of an enamine with water resulting in an amine and a ketone:

FIG. 2

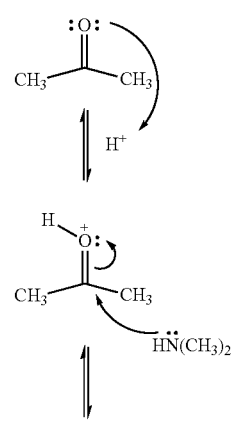

-continued

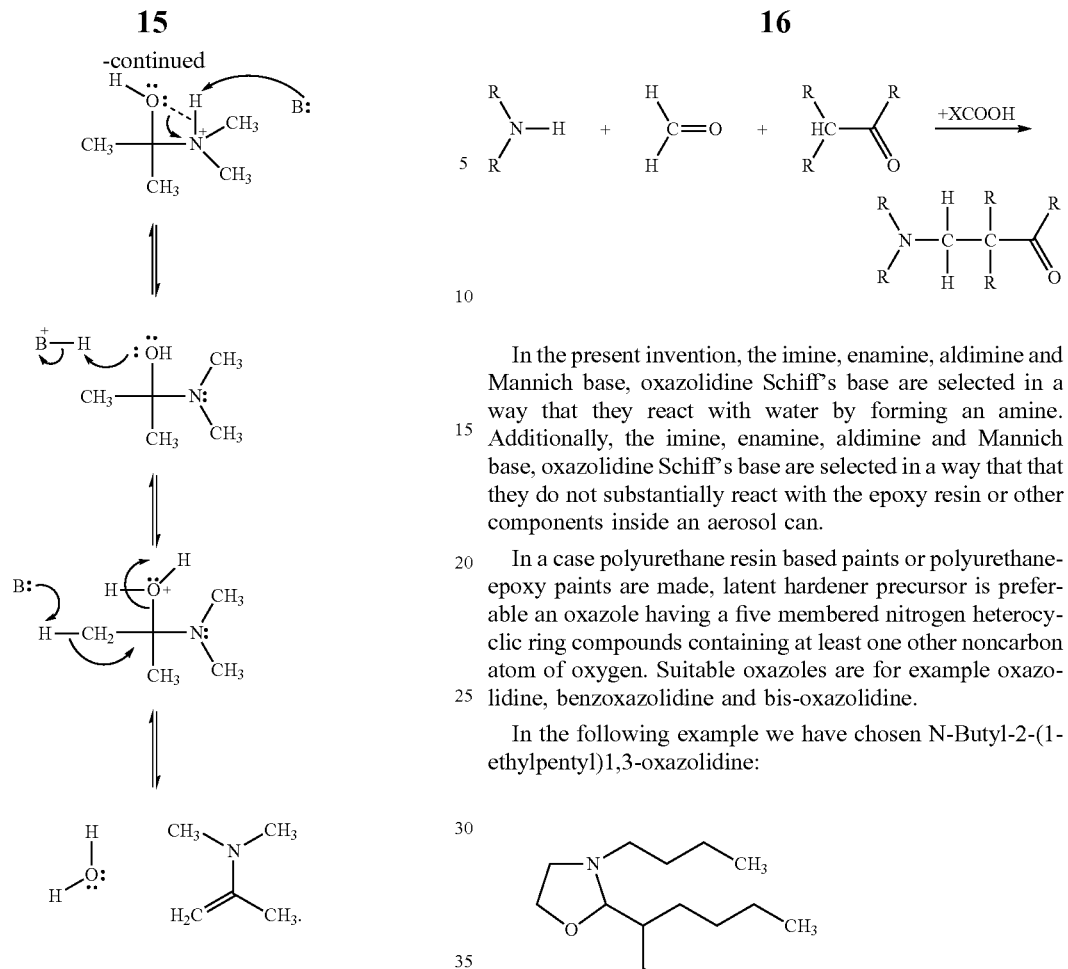

Mannich reaction is an organic reaction which consists of an amino alkylation of an acidic proton placed next to a carbonyl functional group by formaldehyde and a primary or secondary amine or ammonia. The final product is a β-amino-carbonyl compound also known as a Mannich base. Reactions between aldimines and α-methylene carbonyls are also considered Mannich reactions because these imines form between amines and aldehydes.

The Mannich reaction is an example of nucleophilic addition of an amine to a carbonyl group followed by dehydration to the Schiff's base.

FIG. 3 presents, as an example, a reversible reaction of a Mannich base with water resulting in an amine and a ketone:

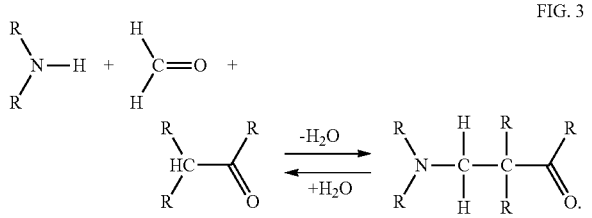

FIG. 3

The reversible Mannich base hardener precursor reaction with water results in an amine and a ketone. The presence of weak acid such as carboxylic acid shifts this reaction equilibrium to the hardener precursor side thus preventing formation of these amine hardeners of epoxy resin as presented in reaction (22a):

In the present invention, the imine, enamine, aldimine and Mannich base, oxazolidine Schiff's base are selected in a way that they react with water by forming an amine. Additionally, the imine, enamine, aldimine and Mannich base, oxazolidine Schiff's base are selected in a way that that they do not substantially react with the epoxy resin or other components inside an aerosol can.

In a case polyurethane resin based paints or polyurethane-epoxy paints are made, latent hardener precursor is preferable an oxazole having a five membered nitrogen heterocyclic ring compounds containing at least one other noncarbon atom of oxygen. Suitable oxazoles are for example oxazolidine, benzoxazolidine and bis-oxazolidine.

In the following example we have chosen N-Butyl-2-(1-ethylpentyl)1,3-oxazolidine:

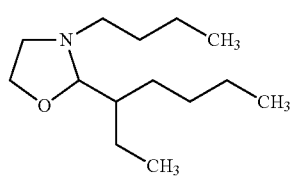

Reactions of this material in the can in the presence with water and a catalytic amount of carboxylic acid the following can happen:

Step 1- Protonation of Nitrogen

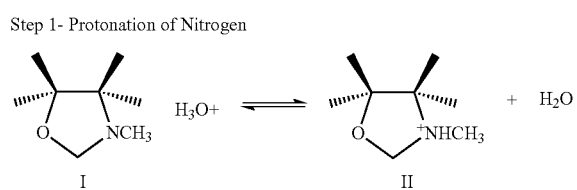

Step 2 - Protonation of Oxygen

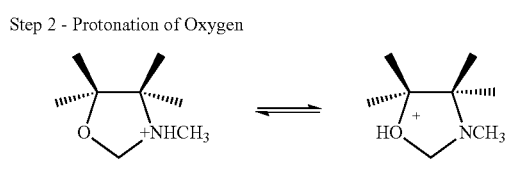

Step 3 - Ring-Opening of O-protonated Oxazolidine to Cationic Imine

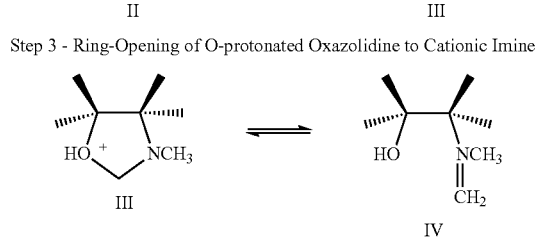

-continued

Step 4 - Hydration of Cationic Imine to Protonated Carbinolamine

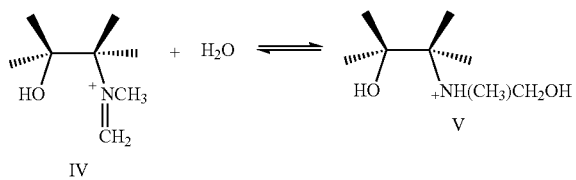

Step 5 - Decomposition of Protonated Carbinolamine

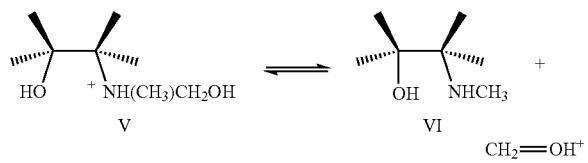

Step 6 - Re-protonation of Nitrogen

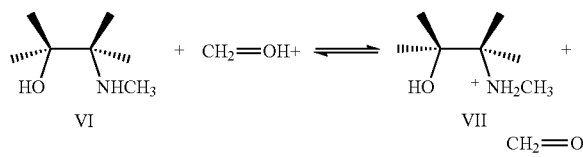

As shown in step 1 if water is available together with carboxylic acid it can lead to the end of step 3.

The carboxylic acid has a double function in this reaction:

1) The carboxylic acid makes the transformation possible to form an imine.

2) The carboxylic acid is the catalyst to prevent the forming of amine by catalyzing the preferred reaction between ketone and amine.

After step 3 the presence of ketone groups together with a catalytic amount of carboxylic acid forces in the case of hydrolyzing the imine, to the preferred reaction between the formed amine with the ketone group forming again an imine. This prevents the amine to react with the iso-cyanate groups of the MDI and HDI binders.

After spraying the paint mixture out of the can, the overload of water (humidity in air) together with the evaporation of the very volatile ketones will lead to a crosslinked coating.

On the basis of above the hardener precursors for polyurethane curing reaction must divided in 2 groups.

A) Precursor hardeners that form an amine after hydrolyzing. They are: imine, ketimine, aldimine, shiffs base, manisch base etc.

B) The precursor hardeners will form a amine that react with the prepolymer forming a urea. These are azoles, preferebale oaxoles and still more preferable oxazolidines, which forms a hardener after hydrolyzing. These hardeners contain amine and alcohol groups. These harneders will form a mixture of polyurethane and urea from polyurethane resins.

In the case of the use of MDI and HDI prepolymers the choice of oxazolidine is also made for its ability to avoid the forming of $CO_2$ by preventing the reaction between $H_2O$ with the isocyanate by the preferred reaction between isocyanate and the formed amine. This together with the transparency of the oxazolidine makes it also possible to make a high quality transparent clear coat with high gloss.

Use of oxazole compounds as a latent hardener is preferable also in a case polyurethane-epoxy hybrid paints will be made.

Other latent hardeners that can also be applied are: imines, ketimines, aldimines, Schiff's Bases, Mannich Bases. In other words, chemicals containing nitrogen with the ability to hydrolyze and form an amine, but can be stabilized in a stable non-changing environment with the addition of a catalytic amount of carboxylic acid forcing a preferred reaction giving a "blocked Nitrogen" not being an amine.

When making polyurethane based paints following chemicals can be used to form the dispersion into the sealed can:

Ketones (methyl-ethyl ketone, acetone MIBK, cyclohexanone, etc.). These are necessary in the stabilizing of the environment inside the aerosol can.

Xylene and other aromatic solvents, aliphatic hydrocarbons, methoxy ether's, acetates, esters, ethers etc. These solvents are not part of any reaction.

Additives: usual paint additives are supporting flow, leveling, anti-shagging, gloss, wetting, adhesion, flexibility etc. These additives are all non-reactive.

Propellants: Dimethyl-ether, propane, butane, 1,1,1,2-tetrafluorethaan, $N_2O$,

The weight ratio between the polyurethane or epoxy resin binder to the hardener precursor is based on the epoxy molar mass of the binder and the equivalent weight of the hardener precursor, the amine content of the hardener precursor. The amount of hardener may vary +/−10%.

In one embodiment weight ratio of the epoxy resin to hardener precursor is from 8:1 to 15:1, preferably from 9:1 to 12:1, more preferably from 10:1 to 11:1 when using the preferred resins and hardener precursors.

In one embodiment the epoxy resin is an epoxy binder with an epoxy molar mass of 450-500, and the hardener precursor is a reaction product of ethylenediamine and methyl isobutyl ketone.

The two-component aerosol formulation of the present invention may further comprise at least one solvent, sometimes also referred to as diluent. Function of the solvent is to lower the viscosity of the epoxy resin and the hardener precursor. The solvent type and the amount of the solvent are selected in a way that the viscosity of the polyurethane-epoxy resin and the hardener precursor mixture is such that the mixture is viscous enough to be suitably sprayed with aid of the propellant from a regular aerosol can.

The solvent is preferably selected from a group consisting of ketones, acetates, glycol ethers, aromatic solvents, aliphatic solvents, or mixtures thereof. More preferably, the solvent is dimethyl ketone, methyl iso-butylketone, methyl ethyl ketone, xylene, 1-methoxy-2-propanol, di-propylene glycol methyl ether cyclohexanone, or mixtures thereof.

Viscosity of liquid phase of the formulation is preferably from 50 to 300 cSt, more preferably from 50 to 150 cSt, measured at 20° C. and at atmospheric conditions. By the liquid phase is meant mixture of the epoxy resin and the hardener precursor, and optionally the solvent.

Aerosol can forms an completely closed environment, which is not influenced by the outside environment, with one exception, temperature.

This means an excellent environment to stabilize a mixture that will be stable as long it stays in this sealed environment. The only thing that can happen for the dispersion inside the aerosol can is that a part or all said dispersion is sprayed out of the can. Inside the can is a homogenous mixture which means that the material that stays in said stable environment will not change in other word will remain as it was.

The influence of changing environment temperatures outside the can are limited to a fluctuation in pressure inside the can. Test by storing on 50° C. and −20° C. show no difference in shelf life and performance when the cans are back to approximately 20° C. which is the average using temperature of an aerosol can.

Free Water: All the above mentioned solvents and propellant already contain free water. The average amount of free water in a formulation is by this fact already between 0-2000 ppm water.

By manufacturing and mixing the paint under normal environmental conditions the paint will pick-up between 2000 and 8000 ppm water (0.2-0.8%) from the air (analyzed by the Karl Fischer titration)

This means the sealed end product inside the aerosol can can contains between 0 and 10.000 ppm (=0.9-1%) of water. This means for a 400 ml aerosol (density content appr. 0.75 gr/ml) between 0 and 3 gr of water.

Product have been tested on performance and shelf life with these amounts of water and show no defects in stability and performance after accelerated tests that correspond with shelf lives of app 3 years.

In one embodiment, the formed amine is primary, secondary or tertiary amine.

In another embodiment, the formed amine is mono-, di- or polyfunctional amine.

In one embodiment, the formed amine is aliphatic, cycloaliphatic or aromatic amine.

Preferred amines are di- and polyfunctional primary amines. The di- and polyfunctional primary amines undergo a reaction with an epoxide group of the epoxy resin to form a hydroxyl group and a secondary amine. The secondary amine can further react with an epoxide group to form a tertiary amine and an additional hydroxyl group.

In one embodiment the imines are reaction products of ethylenediamine and methyl isobutyl ketone; diethyl ketone-based di-imine, preferably N,N'-di(1-ethylpropylidene)-m-xylylenediamine, or mixtures thereof. Ethylenediamine and m-xylylenediamine are very good hardeners for epoxy coatings without side effects like Bernard cells and blushing. The solvent formed after hydrolysing the imine is compatible with the reaction product. The amine hydrogen equivalent weight (ANEW) values are in the dosage range of about 1:10 of binder.

In another embodiment enamine is a reaction product of 3,3,5-trimethylcyclohexanone with secondary diamines; a reaction product of iso-pheronediamine and methyl isobutyl ketone; N,N, bis(1,3-dimethyl-butylidine)ethylenediamine. The diamines give a higher reactivity than monoamines and provide therefore a faster hardening that can lead to a harder film but less flexible film formation.

In one embodiment aldimine is any Schiff base of the general formula RCH—NH or RCH—NR' formed by condensation of an aldehyde with ammonia or a primary amine. Preferred aldimines are N-butyl-2-(1-ethylpentyl)-1,3-oxazolidine or 3-Oxazolidineethanol, 2-(1-methylethyl)-,3,3-carbonate.

In one embodiment, the epoxy resin and polyurethane resins are both existing in the pressurized can. The epoxy resin is selected from the group consisting of bisphenol A epoxy resin, bisphenol F epoxy resin, novolac epoxy resin, aliphatic epoxy resin, glycidylamine epoxy resin, and mixtures thereof.

In one embodiment, the co-existing epoxy resin is bisphenol A epoxy resin. The bisphenol A epoxy resins are formed from reacting epichlorohydrin with bisphenol A. For example, the simplest bisphenol A epoxy resin is formed from reacting two moles of epichlorohydrin with one mole of bisphenol A to form bispheno) A diglycidyl ether (DGEBA). Increasing the ratio of bisphenol A to epichlorohydrin during manufacture produces higher molecular weight polyethers with epoxide groups (also referred to as glycidyl groups). This binder is particularly suitable for regular conditions. It has good water resistance and chemical resistance, and it provides flexible coatings.

In one embodiment, the co-existing epoxy resin is bisphenol F epoxy resin. The bisphenol F epoxy resins are formed from reacting epichlorohydrin with bisphenol F in similar way to bisphenol A. This binder has better chemical resistance compared to bisphenol A epoxy resins, especially at low and high pH ranges.

In one embodiment, the co-existing epoxy resin is novolac epoxy resin. The novolac epoxy resins are formed from reacting phenols with formaldehyde and subsequent glycidylation with epichlorohydrin. Examples of particularly suitable novolac epoxy resins are epoxy phenol novolacs (EPN) and epoxy cresol novolacs (ECN). These provide high chemical resistance together with a high temperature resistance. The formed films are less flexible when the epoxy group content is increased.

In one embodiment, the co-existing epoxy resin is aliphatic epoxy resin. The aliphatic epoxy resins comprise glycidyl epoxy resins and cycloaliphatic epoxides. These materials may act as dilutants, as well. They are preferably applied as auxiliary resins to the above discussed primary resins.

In one embodiment, the co-existing epoxy resin is glycidyl epoxy resin. The glycidyl epoxy resins are formed by reaction of epichlorohydrin with aliphatic alcohols or polyols to give glycidyl ethers or aliphatic carboxylic acids to give glycidyl esters. Examples of preferred glycidyl epoxy resins which can be used in preparing epoxy modified polyurethane paints or epoxy-polyurethane-hybrid paints are dodecanol glycidyl ether, diglycidyl ester of hexahydrophthalic acid, and trimethylolpropane triglycidyl ether. The purpose of these chemicals is to provide a reactive dilutant for its low viscosity. Preferably, they are used in combination with the primary resins as auxiliary binders to balance the reaction taking place. Typically, their reaction rate is clearly lower to the primary resins. In one embodiment, the co-existing epoxy resin is cycloaliphatic epoxide which can be used in preparing epoxy modified polyurethane paints or epoxy-polyurethane-hybrid paints. The cycloaliphatic epoxides contain at least one cycloaliphatic ring in the molecule to which an oxirane ring is fused. The cyclo-aliphatic epoxides are formed by reaction of cyclo-olefins with a peracid, such as peracetic acid. An example of preferred cycloaliphatic epoxide is 3,4-epoxycyclohexylmethyl-3,4-epoxycyclohexane carboxylate. The purpose of these chemicals is to provide a reactive dilutant for its low viscosity. The reaction rate is lower to the primary resins.

In one embodiment, the co-existing epoxy resin is glycidylamine epoxy resin which can be used in preparing epoxy modified polyurethane paints or epoxy-polyurethane-hybrid paints. The glycidylamine epoxy resins are formed when aromatic amines are reacted with epichlorohydrin. Examples of preferred glycidylamine epoxy resins are triglycidyl-p-aminophenol and N,N,N,N-tetraglycidyl-4,4-methylenebis benzylamine. These provide a very high temperature resistant coating and very high reactivity, as there as many epoxy groups in the chain.

In one embodiment a combination of selected different types of primary and auxiliary resins, and optional solvents, is used to ensure linear and steady evaporation of the solvents, and to enhance the forming of the coating and exhibiting desired properties.

A wide range of different epoxy resins, such as the ones mentioned above, are produced industrially and are commercially available. They can all be used the present invention to produce polyurethane—epoxy paints.

The epoxide content is a characteristic feature of the epoxy resins which can be used alongside of the polyurethane resin. The epoxide content is commonly expressed as epoxide number, which is the number of epoxide equivalents in 1 kg of resin (Eq./kg), or as the equivalent weight, which is the weight in grams of resin containing 1 mole equivalent of epoxide (g/mol). One measure may be converted to another with formula:

Equivalent Weight (g/mol)=1000/epoxide number (Eq./kg)

Preferably, the epoxy resin of the present invention is selected from a group consisting of bisphenol A epoxy resin, bisphenol F epoxy resin, epoxy phenol novolacs (EPN), epoxy cresol novolacs (ECN), dodecanol glycidyl ether, diglycidyl ester of hexahydrophthalic acid, trimethylolpropane triglycidyl ether, 3,4-epoxycyclohexylmethyl-3,4-epoxycyclohexane carboxylate, triglycidyl-p-aminophenol, N,N,N,N-tetraglycidyl-4,4-methylenebis benzylamine, or mixtures thereof. More preferably, the epoxy resin of the present invention is selected from bisphenol A epoxy resin or bisphenol F epoxy resin. The characteristics of these two types of binders are the most suitable for the aimed products. They further enable the use of reactive dilutants of high temperature resistant type.

In one embodiment, the epoxy resin has an Equivalent Weight from 100 to 1500 g/eq, preferably from 120 to 700 g/eq, and more preferably from 450 to 500 g/eq.

In another embodiment the epoxy resin is an epoxy with an epoxy group content of 2000-2220 mmol/kg and an epoxy molar mass of 450-500 g/Eq.

In one embodiment the amount of epoxy by weight of the formulation is from 18 to 30%. Preferably, the amount of epoxy by weight of the formulation is from 15 to 30%. Most preferably, the amount of epoxy by weight of the formulation is from 15 to 23%

A wide range of imines and Mannich bases are commercially available. Also enamines and aldimines are commercially available. Suitable imines, enamines, aldimines and Mannich bases can also be synthesized with known procedures.

In one embodiment Mannich base is the reaction product between an aldehyde, such as formaldehyde, and a secondary amine, such as diethanol amine, in a weak acid environment dissolved in organic solvent, such as methyl ethyl ketone, as depicted by FIG. 4:

In yet another embodiment the Mannich base is Ancamine 1110 (Airproducts) i.e. dimethylaminomethylphenol as active ingredient, as depicted by FIG. 5:

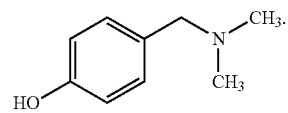

FIG. 5

In yet another embodiment the Mannich base is selected from D.E.H™ 613, D.E.H™ 614, D.E.H™ 615, D.E.H™ 618, D.E.H™ 619 and D.E.H™ 620, or mixtures thereof, available commercially from company DOW.

The propellant may be any suitable propellant known in the art. Preferably, the propellant is selected from a group consisting of dimethyl ether, propane, butane, isobutene, nitrogen, dinitrogen oxide, 1,1,1,2-tetrafluorethane, or mixtures thereof. Most preferably, the propellant is dimethyl ether.

The two-component aerosol formulation may further comprise any additional suitable additives, such as colorants, color pigments and curing accelerators. Preferred colorants and color pigments are iron(II)oxide, iron(III) oxide, phatalo green, titanium(II)oxide and carbon black.

The epoxy resin, the polyurethane resin, the imine, the enamine, the aldimine and the Mannich base, the solvent, the propellant and any additional additives typically need normally be totally water free. In the present invention, due to the addition of a weak acid into the formulation, this requirement is not that strict. The precursors may suitably be water free but the formulation of the present invention tolerates a moderate amount of water present.

In one embodiment, the formulation further contains (free) water. The amount of water is preferably less than 2500 ppm, more preferably less than 2000 ppm, usually less than 600 ppm. In moist ambient the water content included into a formulation from surrounding atmosphere may be up to 250 ppm depending on the temperature and relative humidity. Whereas, the varying grade of precursors used may carry considerably more water into the formulation without using any pre-treatment, such as up to 2000 ppm.

It was found by the inventors that the reversible Mannich base hardener precursor reaction with water discussed above resulting in an amine and a ketone may be modified using an addition of a weak acid into the reaction mixture. When a weak acid, such as carboxylic acid is present, the reaction equilibrium is shifted towards the hardener precursor side as shown in FIG. 6 for reaction 22a:

FIG. 4

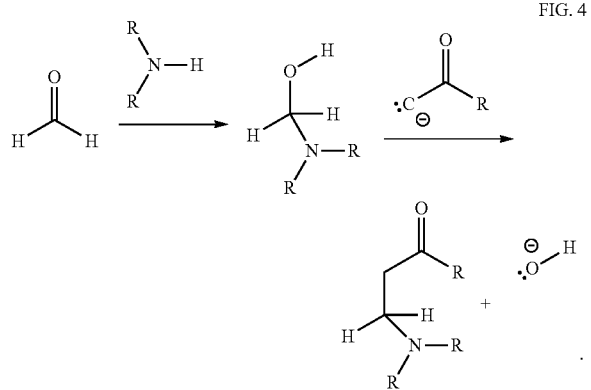

Reaction 22a.

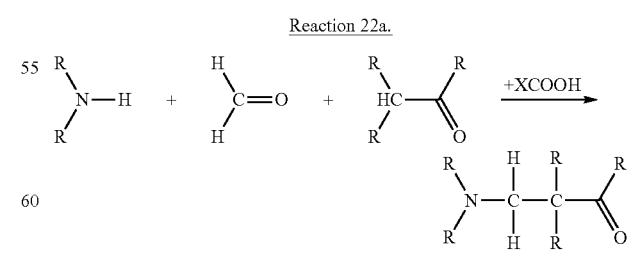

Now the equilibrium favors the presence of the hardener precursor instead of the amine formation. By adjusting the amount, and type, of the weak acid to be added, the equilibrium of the amine formation reaction can be adjusted to favor the presence of the hardener precursor. The amount of weak acid depends on the $pK_a$ value of the acid.

When the amount of water increases considerably i.e. the ejected droplets of the formulation aerosol spray having a very small particle size, 75-100 micrometer, are exposed to environmental conditions and subjected into contact with ambient humidity the equilibrium will eventually shift to favor the formation of the amine. Moreover, the evaporation of the weak acid will further favor the reaction towards the forming of the amine which will enhance the reaction with the epoxy groups of the binder.

Preferably, the weak acid is selected from the group consisting of carboxylic acids.

In one embodiment the weak acid to be applied comprises formic acid (methanoic acid) HCOOH ($pK_a$=3.8), acetic acid (ethanoic acid) $CH_3COOH$ ($pK_a$=4.7), propionic acid (propanoic acid) $CH_3CH_2COOH$ ($pK_a$=4.9), butyric acid (butanoic acid) $CH_3CH_2CH_2COOH$ ($pK_a$=4.8), valeric acid (pentanoic acid) $CH_3CH_2CH_2CH_2COOH$ ($pK_a$=4.8), caproic acid (hexanoic acid) $CH_3CH_2CH_2CH_2CH_2COOH$ ($pK_a$=4.9), oxalic acid (ethanedioic acid) (COOH)(COOH) ($pK_a$=1.2), lactic acid (2-hydroxypropanoic acid) $CH_3CHOHCOOH$ ($pK_a$=3.9), malic acid (2-hydroxybutanedioic acid) $(COOH)CH_2CHOH(COOH)$ ($pK_a$=3.4), citric acid (2-hydroxypropane-1,2,3-tricarboxylic acid) $CH_2(COOH)COH(COOH)CH_2(COOH)$ ($pK_a$=3.1), benzoic acid (benzenecarboxylic acid or phenylmethanoic acid) $C_6H_5COOH$ ($pK_a$=4.2) or carbonic acid (hydroxymethanoic acid) OHCOOH or $H_2CO_3$ ($pK_a$=3.6). Preferably, the weak acid is acetic acid, benzoic acid, propionic acid or mixtures thereof, as these are the most efficient weak acids for the preferred hardener precursors of the present invention.

In one embodiment the weak acid is propionic acid.

In another embodiment the weak acid is acetic acid. Acetic acid has the advantage that it is a volatile liquid which readily evaporates when sprayed.

In yet another embodiment the weak acid is benzoic acid. This acid is a solid which facilitates the handling in preparation.

The amount of acid is dependent on the $pK_a$ value of the acid, the higher the $pK_a$, the less acid is required.

Preferably, the amount of the weak acid to be added into the formulation of the present invention is from 0.1 to 10% by weight (w/w) of the two-component aerosol formulation, preferably from 0.2 to 5.0%, more preferably from 0.25 to 2.0%. The amount of weak acid used depends on the type of acid, the $pK_a$ value, and the selected hardener precursor.

In one embodiment the formulation according to the present invention contains 8-45%, preferably about 20% by weight epoxy binder with an equivalent weight of 120-800, preferably 475, which is preferably a bisphenol epoxy binder; and 1.5-35% by weight, preferably about 3.2% by weight of the hardener, which is preferably the reaction product of isophoronediamine and methyl isobutyl ketone; and 10-30% by weight, preferably about 18.3% by weight solvent, which is preferably 1-methoxy-2-propanol; and 10-30% by weight, preferably about 16.8% by weight of additional solvent, which is preferably butanon-2; and 0.5-3% by weight, preferably about 1.7% of the weak acid, which is preferably acetic acid; and 25-45% by weight, preferably about 40% by weight propellant, which is preferably dimethyl-ether. This composition is especially well suited as fuel, water and chemical resistant clear coat.

In a further aspect, the present invention provides a method for producing a two-component aerosol formulation as depicted above wherein the formulation is prepared under ambient conditions. The method further provides for increasing the storage stability and shelf life of a two-component aerosol formulation when stored in a single chamber aerosol can.

By ambient conditions is meant regular environmental conditions typically comprising water vapour the amount dependent on the temperature and humidity, and water originating from precursor chemicals.

Typically, the stability without the acid and when prepared at water-free conditions using water-free precursors is about a few weeks or months. And especially, if traces of water remain in the can the stability of the formulation decreases rapidly. The formulation of the present invention is stable at least over a year, with preferred choice of precursors at least up to 3 years. The can may be reused several times without any decrease in the storage stability.

Moreover, in the method of the present invention the preparation of the formulation may be performed under ambient conditions simplifying the manufacturing considerably as no protection gasses or drying agents need to be applied. No nitrogen atmosphere is necessary to avoid excess water contamination. In the preparation method according to the present invention merely a weakly acidic formulation is created by adding a suitable, small amount of weak acid thus preventing immediate reactions of the hardener precursors with moisture.

In one embodiment the formulation of the present invention is prepared by first mixing the coating forming chemicals comprising the polyurethane resin and possible epoxy resin, and the hardener precursor, and the weak acid having the $pK_a$ value in the range from 1.2 to 5.2. The obtained mixture is directed into a single chamber can. Subsequently, the propellant is introduced into the can, and the can is sealed, and ready for use.

In one embodiment, when the coating forming chemicals comprise an auxiliary resin or solvent, the weak acid is first dissolved into the solvent, auxiliary resin or mixture thereof, after which at least one resin builder i.e. primary resin is introduced into this mixture. Subsequently, at least one hardener precursor is introduced thereto.

In one embodiment, the solvents, if more than one, are first mixed together. Subsequently, the acid is introduced and mixed with the solvents. The primary, and optionally, the auxiliary resin builder(s) are introduced into the mixture whereafter the hardener precursor(s) is introduced.

Preferably, after introducing all the compounds of the coating forming chemicals into the formulation, it is mixed for a short period, such as 15 min per 1000 l of formulation, prior to directing the mixture into cans and sealing the cans. Excess exposure to ambient should be avoided, if possible.

In a yet further aspect, the present invention provides an aerosol can containing the two-component aerosol formulation discussed above.

The mechanical vessel, the aerosol can, also referred to as a spray can or an aerosol spray can, may be any conventional aerosol can known in the art. Preferably, the aerosol can is a conventional aerosol can having one single chamber.

The aerosol can may be a 2-chamber aerosol can, commonly used for two-component aerosol formulations. In the 2-chamber aerosol can the hardener precursors are in one chamber and the polyurethane resin and the possible epoxy resin in a separate chamber. In this case the hardener precursors and epoxy resin are united in a room inside the can where weak acid environment is present. When united hardener precursors and polyurethane resin and possible epoxy resin can stay for a prolonged time in said room without polyurethane (or epoxy) hardener compounds being formed.

In the aerosol can having a single chamber all components of the formulation are in the same chamber. Examples of single chamber aerosol cans are straight-walled and necked-in cans.

Material of the aerosol can is metal based, for example, aerosol can is made of aluminium or tinplate.

Aerosol cans are commercially available in a diversity of diameters, heights, fill volumes, brim volumes and pressures. As for the shape, there is a wide range of variations available.

Special provisions apply for, especially metal, aerosol cans. These provisions are well known for a skilled person in the art. The special provisions define, for example, total capacities of aerosol cans, pressures of the aerosol cans, volume of liquid phase etc.

An example of such provision is, in Europe, "The Pressure Equipment Directive" (97/23/EC) together with: the directives related to simple pressure vessels (2009/105/EC), transportable pressure equipment (99/36/EC), and Aerosol Dispensers (75/324/EEC); for an adequate legislative framework on European level for equipment subject to a pressure hazard.

Aerosol cans are commercially available, for example from company G. Staehle GmbH u. Co. KG, Germany.

In one embodiment the aerosol may additionally contains one or several mixing balls, preferably two mixing balls, which enhance mixing of the two-component aerosol formulation when the can is shaken before spraying. The mixing balls, also referred to as shaking balls or peas, are well known and commonly used in the art.

The two-component aerosol formulation of the present invention can be packed into an aerosol can with known procedures.

In one embodiment, first a polyurethane resin, possible epoxy resin, weak acid and solvent are mixed together. Optionally, color paste or other additives are added to the mixture and the mixing is continued. The hardener precursor (for polyurethane resin and also possible epoxy resin is/are added to the mixture and mixing is continued. The obtained mixture is filled in a 1-chamber aerosol can with a liquid filling machine. Shaking balls may be added, a valve is put on the can and clinched on the can. The can is finally filled with a suitable amount of liquefied propellant through the valve. An actuator is put on the valve, and the can is ready to be used. All these procedures may be performed under ambient conditions.

The valve may be any common aerosol can valve used in the art. Suitable aerosol can valves are commercially available, for example from company Aptar GmbH, Germany.

The actuator may be any common actuator used in the art. Suitable actuators are commercially available. Example of such actuator is Aptar W2AX from company Aptar GmbH, Germany.

In addition to the weak acid application, the time between mixing and filling the formulation into an aerosol should be kept as short as possible in order to avoid unnecessary water contamination.

In one embodiment the precursor chemicals are treated for removal of excess water prior to application into the formulation.

When the two-component aerosol formulation is sprayed from an aerosol can, there should be a sufficient amount of water, such as humidity, present in the surrounding environment for the hardener precursor to react efficiently with the water to form the amine.

Preferably, the temperature of the environment during the spraying should be such that the two-component aerosol formulation is viscous enough to be sprayed. More preferably, the temperature is from 10 to 50° C., most preferably from 15 to 35° C., and even such as from 17 to 27° C.

In one embodiment the two-component aerosol formulation is used in underwater applications. The pressure inside the can is adjusted to overcome the ambient pressure. Preferably, water displacement additives are used to ensure sufficient contact of the paint spray to the surface to be coated.

The polyurethane resin, epoxy resin, and/or formed amine combinations cure at ambient temperature. In one embodiment the curing is expedited by heating, with temperatures up to 75° C.

Spray pattern, when the aerosol formulation is sprayed from an aerosol can, is a fine mist of aerosol droplets forming a film on sprayed surface. The spray pattern can be flat, such as fan spray, or round depending on the actuator.

In one embodiment, the spray will give a dry film of approx. 15-20 μm after 1 cross layer, with a hardness of persoz hardness at least 180 sec. The coating layer is dust dry after 15 min, touch dry after 30 min, and sufficient hardened after 24 h.

More particularly, there is provided use of the aerosol can as defined above for applying coatings and adhesives.

In one embodiment, the two-component aerosol formulation of the present invention and the method for preparation thereof is used for providing a clear coat.

In one embodiment the aerosol can is used for spraying undercoats, finishing coats, top coats, primers, colored coats, varnishes, lacquers or adhesives.

The aerosol can may be used to spray high quality adhesives, primers, undercoats, top coats, finishing coats, colored coats, varnishes or lacquers in any suitable applications, such as industrial, automotive, marine, construction industry and/or flooring applications.

The following non-limiting examples will further illustrate the present invention.

EXAMPLES

Formulations 1-8 are based on prepolymers MDI, TDI, HDI, IPDI with free NCO between 6 and 25% and phenol blocked isocyanate prepolymers.

Reference Example 1

A two-component aerosol formulation is prepared for production of approx. 625 aerosol cans with filling of 400 ml.

Formulation

Component 1: Epikote 1001-x-75 (epoxy resin in xylene); 113.7 kg; from company Momentive Specialty Chemicals, Netherlands.

Component 2: Epicure 3502 (hardener precursor: reaction product of ethylene-diamine and methyl isobutyl ketone); 9.3 kg; from company Momentive Specialty Chemicals, Netherlands.

Component 3: Methylethyl ketone; 7.8 kg; from company Brenntag Nordic Oy, Finland.

Component 4: Xylene; 23.6 kg; from company Brenntag Nordic Oy, Finland.

Component 5: Dimethyl ether; added per can 96.6 g; from company Dupont de Nemours, Netherlands.

Component 6: acetic acid, 6.86 g; about 2% by weight; from Taminco

Mixing and Filling

To a 200 l barrel were added components 1, 6, 3 and 4, in this order, under ambient conditions. The mixture was mixed with a normal mixer (not high shear) for less than 15 minutes. Component 2 was added to the mixture and it was mixed for further 15 minutes until the mixture was homogeneous and did not separate.

A three piece tinplate aerosol can (a 1-chamber aerosol can) without inner coating was used. Dimensions of the can were: diameter 65 mm; height 157 mm; 400 ml filling (520 ml brimful volume). Supplier for the can was G. Staehle GmbH u. Co. KG, Germany.

Two mixing balls were added to the can and the can was filled with 247.1 g of the prepared mixture containing components 1, 6, 3, 4 and 2 with a liquid filling machine.

An aerosol valve (commercially available from Aptar GmbH, Germany) was put on the can. Specifications of the valve were: Aptar: cup tinplate, stem 0.50 mm, housing 2.4 mm, VPH 0.45 mm, inner gasket: chlorbutyl, outer: gasket n-buna sh 85.

The valve was clinched on the can and the clinch was checked with clinch measurement equipment from company Kroeplin, Weith 27.2 mm, Depth 5.10 mm.

The closed can was filled with liquefied propellant dimethyl ether (component 5) 96.6 g. An actuator (Aptar W2AX from company Aptar) was put on the valve, after which the can filled with the formulation was ready for use.

Reference Example 2

All compounds of the aerosol formulation are added into an aerosol can as follows: main components: polyurethane resin, polyurethane resin precursor hardener, weak acid (benzoiz acid), solvents (acetone and methyl ethyl ketone, propylene glycol mono methyl ether, xylene are added into the can. Propellant (DME) is admixed into the aerosol formulation and then the can is sealed.

Example 1

Clear Coat High Gloss

Example 1

All compounds of the aerosol formulation was added into an aerosol can as shown in reference example 1 or 2. HDI, polyurethane resin precursor hardener, weak acid (benzoic acid), solvents (acetone, methyl ethyl ketone, propylene glycol mono methyl ether, xylene) was added into the can. Propellant (DME) was admixed into an aerosol can and then the can was sealed.

| Raw material | % w/w DI prepolymer |
| --- | --- |
| HDI base pre-polymer | 12 free NCO 11% eq. w 380 |
| precursor hardener | 1.73 eq. w. 55 |
| Acetone | 26.07 |
| Methyl ethyl ketone | 8 |
| Propylene glycol mono methyl ether | 2 |
| Benzoic acid | 10 |
| Xylene | 8 |
| Additives | 0.2 |
| Dimethyl ether | 32 |
| Total | 100 |

Water content of the aerosol formulation inside the can was 6285 ppm after intensively mixing under environmental conditions (Karl Fischer). Additionally, water was provided into the aerosol dispersion with (dimethyl ether) DME. The water content of dimethyl ether was calculated according to certificate of analyses provided by supplier.

Surface Properties of the Sprayed Paint
Adhesion to Ferro surface 865 psi
Hardness 185 pendels Koenig
Gloss 100%
Completely dry and chemical resistant 10 min

Example 2

Clear Coat High Gloss

All compounds of the aerosol formulation were added into an aerosol can as in examples 1 or reference example 1. Main components: MDI, polyurethane resin precursor hardener, weak acid (benzoic acid), solvents (acetone, methyl ethyl ketone, propylene glycol mono methyl ether) were added into aerosol can. Propellant (DME) was admixed into an aerosol can and then the can was sealed.

| Raw material | % w/w |
| --- | --- |
| MDI based pre-polymer | 15.0 Free NCO 15.9% eq. w. 265 |
| Precursor hardener | 4.87 eq. w. 86 |
| Acetone | 20.93 |
| Benzoic acid | 8 |
| Methyl ethyl ketone | 10 |
| Propylene glycol mono methyl ether | 3 |
| Additives | 0.2 |
| Dimethyl ether | 38 |
| Total | 100 |

Water content of the aerosol formulation inside the can was 6252 ppm after intensively mixing under environmental conditions (Karl Fischer). Additionally water was provided into the aerosol dispersion with (dimethyl ether) DME. The water content of dimethyl ether was calculated according to certificate of analyses provided by supplier.

Surface Properties of the Sprayed Paint
Adhesion to Ferro surface 848 psi
Hardness 202 pendels Koenig
Gloss 100%
Completely dry and chemical resistant 5 min

Example 3

Colored Top Coat:

All compounds of the aerosol formulation was added into an aerosol can as in examples 1-2 (main components: MDI, polyurethane resin precursor hardener, pigment (iron oxide), weak acid (acetic acid), solvents (acetone, methyl ethyl ketone) were added into aerosol can. Propellant (DME) was admixed into an aerosol can and then the can was sealed.

| Raw material | % w/w |
| --- | --- |
| MDI base pre-polymer | 15 Free NCO 15.9% eq. w. 270 |
| Precursor hardener | 6.78% eq. w. 122 |
| Iron Oxide | 6.5 |
| Acetone | 15.42 |
| Acetic acid | 9.5 |
| Methyl ethyl ketone | 8 |
| Xylene (O, M, P, mixture) | 6 |

-continued

| Raw material | % w/w |
|---|---|
| Additives | 0.8 |
| Dimethyl ether | 32 |
| Total | 100 |

Water content of the aerosol formulation inside the can was 8963 ppm after intensively mixing under environmental conditions (Karl Fischer). Additionally water was provided into the aerosol dispersion with (dimethyl ether) DME. The water content of dimethyl ether was calculated according to certificate of analyses provided by supplier.

Surface Properties of the Sprayed Paint
Adhesion to Ferro surface 852 psi
Hardness 199 pendels Koenig
Gloss 100%
Completely dry and chemical resistant 8 min.

Example 4

Primer Grey

All compounds of the aerosol formulation were added into an aerosol can as in examples 1-3 (main components: blocked TDI, polyurethane resin precursor hardener, weak acid (propionic acid), pigments (TiO$_2$, carbon black), fillers (calcinated silica), solvents (acetone and methyl ethyl ketone, propylene glycol mono methyl ether)). Propellant (DME) was admixed into an aerosol can and then the can was sealed.

| Raw material | % w/w |
|---|---|
| Phenol blocked aromatic prepolymer | 15 free NCO 2.7% eq. w 933 (blocked) |
| Precursor hardener | 1.38 eq. w. 86 |
| Calcinated silica | 3.5 |
| Bentonite | 0.4 |
| Propionic acid | 9.3 |
| TiO$_2$ | 5 |
| Carbon black | 0.3 |
| Acetone | 19.32 |
| Methyl ethyl ketone | 10 |
| Propylene glycol mono methyl ether | 3 |
| Additives | 0.8 |
| Dimethyl ether | 32 |
| Total | 100 |

Water content of the aerosol formulation inside the can was 9025 ppm after intensively mixing under environmental conditions (Karl Fischer). Additionally, water was provided into the aerosol dispersion with (dimethyl ether) DME. The water content of dimethyl ether was calculated according to certificate of analyses provided by supplier.

Surface Properties of the Sprayed Paint
Adhesion to Ferro surface 952 psi
Hardness 222 pendels Koenig
Matt
Completely hardened 8 min. after 10 min sandable Example 5

Products: Clear Coat

All compounds of the aerosol formulation was added into an aerosol can as in examples 1-4 (main components: MDI or HDI, polyurethane resin precursor hardener (oxazolidine), weak acid (benzoic acid), solvents (acetone, methyl propyl ether)). Propellant (DME) was admixed into an aerosol can and then the can was sealed.

| Raw material | % w/w |
|---|---|
| MDI 100% and or HDI | 15 |
| MEK | 10 |
| Acetone | 29.6 |
| Methoxy propyl ether | 2 |
| Additive mix | 1 |
| Oxazolidine | 3.4 |
| Benzoic acid | 6 |
| Dimethyl ether | 33 |
| Total | 100 |

Water content of the aerosol formulation inside the can was 6458 ppm after intensively mixing under environmental conditions (Karl Fischer). Additionally water was provided into the aerosol dispersion with (dimethyl ether) DME. The theoretical water content of dimethyl ether was calculated according to certificate of analyses provided by supplier.

Surface Properties of the Sprayed Paint
Color dry film Hazen Units<10 (very transparent and without color)
Gloss: 100% (measure angle 60°)
Adhesion>950 psi
Scratch resistance: pencil test H6: pased
Konig pendel hardness: >200 pendels
Solvent resistance: Very good
alkaline resistance: very good
acid resistance. good.
UV resistance. very good.

This formulation can be tuned by using more or less MDI and or HDI of course in balance with the calculated amount of oxazolidine in this case: eq.weight oxazolidine×100/eq.weight binder=86×100/380=22.6 parts oxazolidine on 100 parts of binder.

Example 6

Formulation Colored Paint

All compounds of the aerosol formulation was added into an aerosol can as in examples 1-5 (main components: MDI or HDI, polyurethane resin precursor hardener (oxazolidine), weak acid (benzoic acid), solvents (acetone, methyl propyl ether)). Propellant (DME) was admixed into an aerosol can and then the can was sealed.

| Raw material | % w/w |
|---|---|
| MDI 100% and or HDI | 15 |
| MEK | 10 |
| Pre-grinded white color paste | 10 (representing 7.1% pure TiO2) |
| Acetone | 18.2 |
| Methoxy propyl ether | 2 |
| Additive mix | 1 |
| Oxazolidine | 4.8 |
| Benzoic acid | 6 |
| Dimethyl ether | 33 |
| Total | 100 |

Water content was 6005 ppm (calculated on total content measured without propellant (Karl Fischer method) with the addition of the theoretical Water content of the propellant given in TDS of the supplier)

Surface Properties of the Sprayed Paint
Gloss: 96% (measure angle 60°)
Adhesion >950 psi
Scratch resistance: pencil test H6: pased
Konig pendel hardness: >200 pendels
Solvent resistance: Very good
Alkaline resistance: very good
Acid resistance. good.
UV resistance. very good.

This formulation can be tuned by using more or less MDI and or HDI of course in balance with the calculated amount of oxazolidine in this case: eq.weight oxazolidine×100/eq.weight binder=122×100/380=32.1 parts oxazolidine on 100 parts of binder.

By using a variety of different color pastes any color can be made.

Example 7

Epoxy/Substituted Phenol-TDI Based High Gloss White

All compounds of the aerosol formulation were added into an aerosol can as in previous examples. Main components: epoxy modified TDI and epoxy resin, polyurethane/epoxy resin precursor hardener (ketimine, weak acid (benzoic acid), solvents (acetone, methyl propyl ether)). Propellant (DME) was admixed into an aerosol can and then the can was sealed.

| Raw material | % w/w |
| --- | --- |
| Substituted Phenol-TDI | 8 |
| Epoxy binder | 10 |
| MEK | 10 |
| Pre-grinded white color paste | 10 (representing 7.1% pure TiO2) |
| Acetone | 16.7 |
| Methoxy propyl ether | 2 |
| Additive mix | 1 |
| Ketimine (eq. w. 78) | 3.3 |
| Benzoic acid | 6 |
| Dimethyl ether | 33 |
| Total | 100 |

Example 8

Epoxy/Substituted Phenol-TDI Based Clear Coat High Gloss

All compounds of the aerosol formulation were added into an aerosol can as in previous examples. Main components: epoxy modified TDI, polyurethane/epoxy resin precursor hardener (oketimine), weak acid (benzoic acid), solvents (acetone, methyl propyl ether). Propellant (DME) was admixed into an aerosol can and then the can was sealed.

| Raw material | % w/w |
| --- | --- |
| Substituted Phenol-TDI | 8 |
| Epoxy binder | 10 |
| MEK | 10 |
| Acetone | 26.7 |
| Methoxy propyl ether | 2 |
| Additive mix | 1 |
| Ketimine (eq. w. 78) | 3.3 |
| Benzoic acid | 6 |
| Dimethyl ether | 33 |
| Total | 100 |

Example 9

By manufacturing and mixing the paint under normal environmental conditions the paint will pick-up between 2000 and 8000 ppm water (0.2-0.8%) from the air (analyzed by the method of Karl Fischer)

This means the sealed end product inside the aerosol can can contain between 0 and 10.000 ppm (=0-1%) of water. This means for a 400 ml aerosol (density content app 0.75 gr/ml) between 0 and 3 gr of water.

Product has been tested on performance and shelf-live with these amounts of water and show no defects in stability and performance after accelerated tests that correspond with shelf lives of appr. 3 years.

The precursor hardeners in further 10—examples must divided in 2 groups.

Precursor hardeners that form a amine after hydrolyzed: imine, ketimine, aldimine, shiffs base, Mannisch base etc. These will in curing reaction polyurethanes from polyurethane resins Pecursor hardeners which will be first hydrolyzed to form imines. These imines will then be hydrolyzed to form an amine that react with the pre-polymer forming a urea. In this group belong Azoles, preferable oxazoles such as oxazolidines, to form a hardener with amine and alcohol groups after hydrolyzing. These will form in a curing reaction a mixture of polyurethane and urea from polyurethane resins.

In the examples 10-14 it has been given formulations based on pre-polymers MDI, TDI, HDI, IPDI with free NCO between 6 and 25% and phenol blocked isocyanate prepolymers. These were prepared as shown in reference examples 1 and 2 as well as in examples 1-9.

Example 10

Clear Coat High Gloss

| Raw material | % w/wtDI |
| --- | --- |
| HDI base pre-polymer | 12 |
| Free NCO 11% | eq. w 380 pre-polymer |
| Hardener precursor, amine forming | 1.73 eq. w. 55 |
| Acetone | 25.72 |
| Methyl ethyl keton | 8 |
| Propylene glycol mono methyl ether | 2 |
| Benzoic acid | 10 |
| Xylene | 8 |
| Additives | 0.2 |
| Dimethyl ether | 32 |
| Total | 100 |

Tests

Water content 6285 ppm after intensively mixing under environmental conditions (karl fisher)+ water content dimethyl ether from certificate of analyses provided by supplier.

Dust dry app 20 min
Adhesion to Ferro surface 834 psi (after 8 days)
Hardness 173 pendels Koenig (after 8 days) gloss 100% completely dry and chemical resistant 120 min

Example 11

Clear Coat High Gloss

| Raw material | % w/wtDI |
| --- | --- |
| HDI base pre-polymer | 12 |
| Free NCO 11% | eq. w 380 |

| Raw material | % w/wtDI |
| --- | --- |
| Precursor hardener (oxazolidine) | 2.42 eq. w. 77 |
| Acetone | 26.41 |
| Methyl ethyl keton | 8 |
| Propylene glycol mono methyl ether | 2 |
| Benzoic acid | 10 |
| Xylene | 8 |
| Additives | 0.2 |
| Dimethyl ether | 32 |
| Total | 100 |

Tests

Water content 6285 ppm after intensively mixing under environmental conditions (karl fisher)++ water content dimethyl ether from certificate of analyses provided by supplier.

Dust dry app 20 min
Adhesion to Ferro surface 865 psi
Hardness 185 pendels Koenig
gloss 100%
completely dry and chemical resistant 120 min

Example 12

Clear Coat High Gloss

| Raw material | % w/w |
| --- | --- |
| MDI based pre-polymer | 15 |
| Free NCO 15.9% | eq. w. 265 pre-polymer |
| Oxazolidine | 4.87 eq. w. 86 |
| (hardener precursor forming amino and hydroxyl functionality when hydrolyzed) | |
| Acetone | 20.93 |
| Benzoic acid | 8 |
| Methyl ethyl keton | 10 |
| Propylene glycol mono methyl ether | 3 |
| additives | 0.2 |
| Dimethyl ether | 38 |
| Total | 100 |

Water content 4250 ppm after intensively mixing under environmental conditions (karl fisher)+water content dimethyl ether from certificate of analyses provided by supplier.

Tests
Dust dry app 20 min
Adhesion to Ferro surface 848 psi
Hardness 202 pendels Koenig
gloss 100%
completely dry and chemical resistant 120 min

Example 13

Colored Top Coat:

| Raw material | % w/w |
| --- | --- |
| MDI based pre-polymer | 15 |
| Free NCO 15.9% | eq. w. 270 pre polymer |
| Oxazolidine | 6.78 eq. w. 122 |
| (hardener precursor forming amine and alcohol groups when hydrolyzed) | |
| Iron Oxide | 6.5 |
| Color pigment | |
| Acetone | 15.42 |
| Acetic acid | 9.5 weak acid |
| Methyl ethyl ketone | 8 |
| Xylene (O, M, P, mixture) | 6 |
| Additives | 0.8 |
| Dimethyl ether | 32 |
| Total | 100 |

Water content 8963 ppm after intensively mixing under environmental conditions (karl fisher)+water content dimethyl ether from certificate of analyses provided by supplier.

Tests
Dust dry app 23 min
Adhesion to Ferro surface 852 psi
Hardness 199 pendels Koenig
gloss 100%
completely dry and chemical resistant 120 min.

Example 14

Primer Grey

| Raw material | % w/w |
| --- | --- |
| Phenol blocked aromatic polyurethane prepolymer | 15 |
| (Free NCO 2.7% | eq. w. 933 blocked) |
| Oxazilidine (hardener precursor) | 1.38 eq. w. 86 |
| Calcinated silica | 3.5 |
| (filling compound for primer/fillers) | |
| Bentonite | 0.4 |
| (Thixothrope modifier based on clay) | |
| Propionic acid | 9.3 |
| TiO2 | 5 |
| Carbon black | 0.3 |
| Acetone | 20.12 |
| Methyl ethyl ketone | 10 |
| Propylene glycol mono methyl ether | 3 |
| Additives | 0.8 |
| Dimethyl ether | 32 |
| Total | 100 |

Water content 2458 ppm after intensively mixing under environmental conditions (karl fisher)+water content dimethyl ether from certificate of analyses provided by supplier.

Tests
dust dry app 20 min
Adhesion to Ferro surface 952 psi
Hardness 222 pendels Koenig
Matt
completely hardened 120 min and after 180 min sand able

Example 15

Liquid Intermediate Product for an Aerosol Formulation
Preparing a batch of intermediate product for app 600 aerosol cans of 400 ml
Mixing barrel 200 L
Following amount are added to the mixing barrel:

| | |
| --- | --- |
| benzyl alcohol | 1.6902 kg |
| Anti-foam additive | 0.7512 kg |
| Acetone | 51.8891 kg |
| Methoxy propylether | 9.3900 kg |
| Hardener precursor | 8.1581 kg |
| flow additive | 0.1878 kg |
| slip additive | 0.1878 kg |

-continued

| | |
|---|---|
| Solvesso 100 (100% aromatic solvent) | 3.7560 kg |
| Xylene | 22.5360 kg |
| These ingredients will be mixed with a mixer (rotation speed ca 800 rpm) | |
| Carboxylic acid | 1.1750 kg |
| After adding the carbolic acid, the mix will gain be mixed for app 5 min (800 rpm) | |
| Epoxy binder | 9.6259 kg |
| Poly Urethane prepolymer (HDI) | 13.6159 kg |
| After adding the binders, the total will be mixed for app 5 min (800 rpm) | |

After this mixing the product is ready tom be filled in an aerosol can, to be closed with a valve and filled till 400 ml with the liquefied propellant. Above mentioned example was based on following principles:
  solvents are filled in a barrel paint additives are added the amount water present is defined by taking a sample of water presence with Karl Fisher Method based on the exact amount of water the needed amount of precursor hardener is calculated to react the water away and give a rest amount of precursor hardener that is sufficient to give full hardening of the binder. The precursor hardener is added to the solvent/additive mix and stirred gently for app 2 min. After 20 min a sample is analyzed to check that all the water has reacted is no longer present as water in the mixture. Based on the measured amount of water at the start the precursor hardener over dose is calculated and also gives the amount of rest product (amine containing).

The amount carbolic acid needed to react the amine away to an ammonium-carboxylate. After adding the carbolic acid the mixture is stirred gently for app 10 min. The binders can be added to a water free solvent/additive/precursor hardener/amino-carboxylate mixture. The free alcohol formed at the hydrolyzing of the precursor hardener will be used as terminator of the highly reactive HDI monomer of the pu binder. After stirring this mixture gently for app 5 min the product is ready to be filled in an aerosol can, closed with a valve and be filled with the propellant In case of colored top coats the colorants will be added to the mixture together with the binders.

The invention claimed is:

1. A method for preparing a paint forming dispersion having extended shelf life, into a sealed and pressurized aerosol can, said dispersion preventing hardener compounds to be formed from hardener precursors, said method comprising:
  bringing into said can a paint forming dispersion containing after sealing the can: liquefied propellant, polyurethane resins of an amount W2, hardener precursor of said polyurethane resins of an amount W3 and ketones;
  wherein free water of amount W1, which amount W1, is in a range of 1-10000 ppm has been brought into said can alongside with said other paint dispersion forming chemicals before sealing the can; and
  wherein said polyurethane hardener precursors are selected from an imine, an enamine, a Mannich base, a Schiff's base, an aldimine, an azole an oxazole and mixtures thereof, wherein
    polyurethane resins are selected from MDI, HDI, IPDI, TDI, and phenol blocked TDI prepolymers, wherein
    the paint forming dispersion further contains a weak acid, as a catalyst, to prevent formation of the polyurethane hardeners from said polyurethane hardener precursors, wherein the weak acid (XCOOH), is selected from a group having a $pK_a$ value in a range from 1.2 to 9, and the amount of said weak acid being in a range of 0.01-10% and is adjusted so, that it catalyzes a reaction (2a; 2a1) shifting the equilibrium of the reversible reaction (2a;2a1), in alternative pathways A or B, between the free water present in said dispersion and polyurethane hardener precursor back to formation of said initial polyurethane hardener precursor:

A)

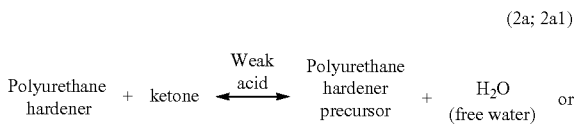

(2a; 2a1)

B)

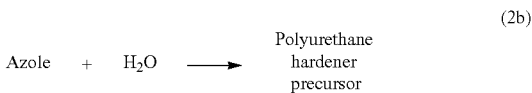

(2b)

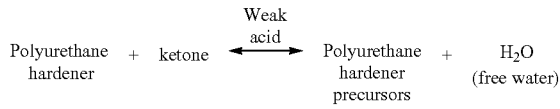

(2a; 2a1)

and wherein said polyurethane hardener is a compound with at least an amine and possibly also a hydroxyl functionality, and
wherein said reversible reaction (2a; 2a1) takes place during the entire retention time of the dispersion in the sealed can, so that the amount of free water (W1) is unchanged and remains between 1-10000 ppm between two successive uses of the can.

2. A method for preparing a paint forming dispersion having extended shelf life, into a sealed and pressurized aerosol can, said dispersion preventing hardener compounds to be formed from hardener precursors, said method comprising:
  bringing into said can a paint forming dispersion which contains after sealing the can: liquefied propellant, polyurethane resins of an amount W2, epoxy resins of an amount W4, hardener precursor of an amount W3 of said polyurethane resins, hardener precursors of said epoxy resins of an amount W5 and ketones; and
  wherein free water of amount W1, which amount W1 is a range of 1-10000 ppm, is brought into said can alongside with said other paint dispersion forming chemicals before sealing the can; and
  wherein said polyurethane hardener precursors and epoxy hardener precursors are selected from an imine, an enamine, a Mannich base, a Schiff's base, an oxazole, an oxazolidine, an aldimine, and mixtures thereof, wherein
    polyurethane resins are selected from a group comprising of MDI, HDI, IPDI, TDI, and phenol blocked TDI prepolymers, wherein
    the paint forming dispersion further contains a weak acid, as a catalyst, to prevent formation of the polyurethane hardeners from said polyurethane hardener precursors and the formation of epoxy hardeners from said epoxy hardener precursors, wherein
    said polyurethane hardener is a compound with at least amine and possibly also a hydroxyl functionality and epoxy hardener is a compound with amine functionality, the weak acid (XCOOH), selected from a group having a $pK_a$ value in a range from 1.2 to 9, and the amount of said weak acid being in a range of 0.01-10% (w/w) of the dispersion and is adjusted so, that it catalyzes the reaction (2; 2a2), by shifting of the equilibrium of reversible reaction (2; 2a2) between the free water present in said dispersion and polyurethane hardener and epoxy hardener back to formation of said initial polyurethane hardener precursors and epoxy hardener precursors, in alternative pathways A or B:

A)

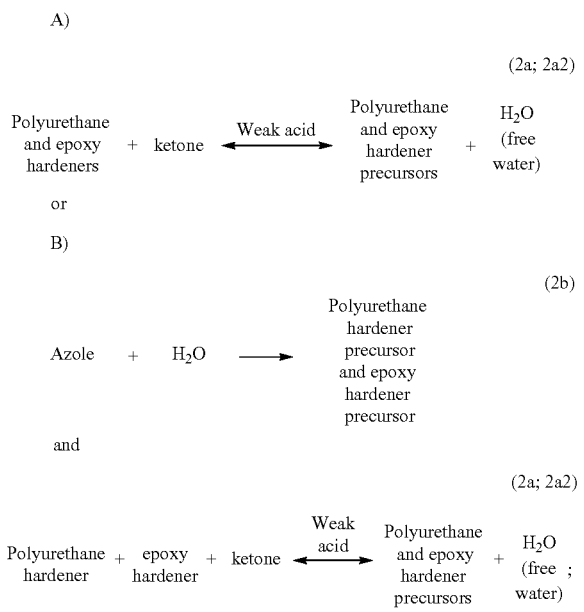

wherein said reversible reaction (2a; 2a2) takes place during the entire retention time of the dispersion in the sealed can so that the amount of free water is unchanged and remains between 1-10000 ppm, between two successive uses of the can.

3. The method of claim 2, wherein the polyurethane hardener precursor and the possible epoxy hardener precursor are an azole compound, and the reaction proceeds via pathway B, in which, the azole compound is first hydrolyzed to form an imine in reaction (2b) and then this imine takes part into reversible reaction between hardener precursor(s) (imine) and water (2a).

4. The method of claim 1, wherein during the entire retention time of said paint forming dispersion the reversible reaction (2a) prevents the formation of polyurethane hardener amines and possible polyurethane hardener hydroxyls from said polyurethane hardener precursors and keeps the amount W1 of free water and the amount W2 of said polyurethane resins and the amount W3 of said polyurethane hardener precursors of said polyurethane resins constant between two successive uses.

5. The method of claim 2, wherein during the entire retention time of said paint forming dispersion the reversible reaction (2a) prevents also the formation of epoxy hardeners from said epoxy hardener precursors, wherein the epoxy hardener is a compound having the amine functionality, and keeps the amount W1 of free water and the amount W4 of said epoxy resins and the amount W5 of said hardener precursor of said epoxy resins constant between two successive uses.

6. The method of claim 1, wherein the paint forming dispersion includes solid water scavengers selected from a group of zeolite, calcium carbide, activated carbon, silica, activated alumina, $CaSO_4$, CaO, metal alkoxides, and clay less than 1% w/w.

7. The method of claim 1, wherein said reversible reaction (2a; 2a1) always takes place between two successive uses of paint formulation dispersion.

8. The method of claim 7, wherein said reversible reaction (2a;2a1) enables a retention time up to 5 years.

9. The method of claim 1, wherein after storing said paint formation dispersion an extended time period of 0.5-3 years, the relative amount W1 of free water to the amount W2 of polyurethane resins W2 and to the amount W3 of hardener precursors of said polyurethane resins is same as in the initial dispersion in a freshly sealed can.

10. The method of claim 1, wherein the catalytic compound is a weak acid (XCOOH), selected from a group having a $pK_a$ value in a range from 1.2 to 9.

11. The method of claim 10, wherein the amount of the weak acid is from 0.01 to 10% by weight (w/w) of the dispersion.

12. The method of claim 10, wherein the weak acid is a carboxylic acid selected from formic acid, acetic acid, propionic acid, butyric acid, valeric acid, caproic acid, oxalic acid, lactic acid, malic acid, citric acid, benzoic acid, and mixtures thereof.

13. The method of claim 12, wherein the weak acid is propionic acid, acetic acid, benzoic acid or mixtures thereof.

14. The method of claim 1 for preparing a dispersion, in the sealed and pressurized aerosol can, which dispersion, is prepared by forming a paint forming dispersion from the paint forming chemicals, which chemicals, contain polyurethane resin and polyurethane hardener precursor and also possible epoxy resin and possible epoxy hardener precursor, weak acid as a catalyst, ketones and a possible organic solvent, the method further comprising:
mixing said paint forming chemicals and directing the obtained mixture into an aerosol can, and providing the propellant into the can and sealing the can or;
sealing the can and directing said paint forming chemical(s) into the can before or after sealing the can separately or in combination with each other, and providing the propellant into the can after sealing the can to obtain a paint forming dispersion inside the can;
wherein alongside of said paint forming chemicals present in paint forming dispersion is brought into said can also free water the amount W1, which amount W1, is in a range of 1-10000 ppm.

15. The method of claim 1 for preparing a dispersion in the sealed and pressurized aerosol can by adding a polyurethane resin and a polyurethane hardener precursor and also possible epoxy resin and possible epoxy hardener precursor, into a separate sealable compartment inside the can, the method further comprising:
adding a weak acid, ketone and a possible solvent inside the can; and providing the propellant inside the can; sealing the can; and
bringing and mixing together paint forming chemicals, including also ketones, the weak acid and a possible solvent inside a same room of the can, for making a paint forming dispersion inside the can, wherein alongside of said paint forming chemicals present in paint forming dispersion is brought into said can also free water an amount W1 which amount W1 is in a range of 1-10000 ppm.

16. The method of claim 14, wherein the polyurethane resin is mixed with the weak acid, and with an organic solvent which contains ketone, and subsequently introducing polyurethane hardener precursor into the mixture.

17. The method of claim 1 for preparing a paint forming dispersion in the sealed and pressurized aerosol can, the method further comprising:

first preparing a mixture by mixing following chemicals with each other: paint additives, dispersion additives, solvent, ketones, wherein alongside of said liquid chemicals present in mixture also free water is brought into mixture of an amount W1, which amount, W1 is in a range of 1-10000 ppm;

then reacting polyurethane hardener precursors, with the free water of the mixture, wherein said polyurethane hardener precursors are selected from an imine, an enamine, a Mannich base, a Schiff's base, an aldimine, an azole, and mixtures thereof, after substantially all free water has been reacted with the polyurethane hardener precursors, preparing a liquid mixture by adding a weak acid (XCOOH) to said mixture, to shift the reversible reaction (2a) in reaction pathway A or B to favor the formation of the polyurethane hardener precursors (2a: 2a1)

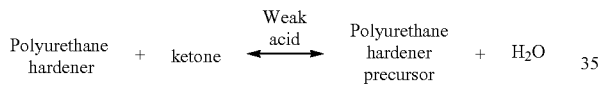

directing the obtained liquid mixture into an aerosol can, and providing the propellant and polyurethane resins into the can and sealing the can to obtain a paint forming dispersion inside the can, wherein in said method, the weak acid (XCOOH), selected from a group having a $pK_a$ value in a range from 1.2 to 9, and the amount of the weak acid (XCOOH) is 0.01-10% (w/w) from the weight of the dispersion and adapted so that it can catalyze first the reversible reaction (2; 2a1) in liquid mixture by shifting the equilibrium of the reversible reaction, between the free water present in said liquid mixture and polyurethane hardener precursor back to formation of said initial polyurethane hardener and it can also catalyze secondly the reversible reaction (2; 2a1) in paint forming dispersion by shifting the equilibrium of the reversible reaction, between the free water present in said paint forming dispersion and polyurethane hardener precursor back to formation of said initial polyurethane hardener and wherein an additional amount of polyurethane hardener precursor can be added to prepare said liquid mixture for replacing the polyurethane hardener precursor which has been consumed for reacting with water.

18. The method of claim 2 for preparing a paint forming dispersion in a sealed and pressurized aerosol can, the method further comprising:

first preparing a mixture by mixing following chemicals with each other: paint additives, dispersion additives, solvent, ketones, wherein alongside of said liquid chemicals present mixture also free water is brought into liquid mixture an amount W1 which amount W1 is in a range of 1-10000 ppm;

then reacting polyurethane hardener precursors and epoxy hardener precursors, with the free water present in the mixture, wherein said polyurethane hardener precursors and epoxy hardener precursors are selected from an imine, an enamine, a Mannich base, a Schiff's base, an aldimine, an azole and mixtures thereof, after substantially all free water have been reacted with the polyurethane hardener and epoxy precursors, preparing a liquid mixture by adding a weak acid, to shift the reaction (2a) via pathway A or B to favor the formation of the polyurethane hardener precursors and epoxy hardener precursors from polyurethane hardeners and epoxy hardeners, (2a; 2a2)

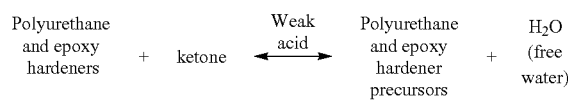

directing the obtained liquid mixture into an aerosol can, providing the propellant and polyurethane and epoxy resins into the can and sealing the can to obtain a paint forming dispersion inside the can, wherein in said method the weak acid (XCOOH) is selected from a group having a $pK_a$ value in a range from 1.2 to 9, and the amount of the weak acid is in a range of 0.01-10% (w/w) from the weight of the dispersion and adapted so that it can catalyze a reaction (2; 2a2) the formation of the polyurethane hardener precursors and epoxy hardener precursors from polyurethane hardeners and epoxy hardeners in the presence of free water ($H_2O$) in the liquid mixture and also to catalyze the reaction (2; 2a2) by shifting the equilibrium of the reversible reaction (2a; 2a2), in alternative pathways A or B, between the free water present in said paint forming dispersion and polyurethane hardener precursors and epoxy hardener precursors back to formation of said initial polyurethane hardener and epoxy hardener and wherein an additional amount of polyurethane hardener precursor and epoxy hardener precursor can be added to prepare said liquid mixture for replacing the polyurethane hardener precursor and epoxy hardener precursor which has been consumed for reacting with water.

19. The method of claim 15, wherein the method comprises additionally step of using the aerosol can by spraying the paint forming dispersion out of the can to form a dry paint film having a surface gloss of 5-100.

20. The method of claim 19, wherein using the can comprises spraying the paint forming dispersion out from the can for enabling water, such as humidity, present in the surrounding environment to react with the polyurethane hardener precursor and with the possible epoxy hardener precursor to form a hardener compound with the amine and possible also with the hydroxyl functionality and then to form on the target surface the dry paint film.

21. The method of claim 19, wherein the weak acid (XCOOH) is added into paint forming dispersion an amount which will enable, after using the can by spraying the paint forming dispersion from the can, to enable to form a dry paint film having gloss in a range of 10-100 from said paint forming dispersion and also contribute to a higher adhesion to the paint surface by an etching method.

22. The method of claim 19, wherein the dry paint film is transparent and has a gloss in a range of 10-100, under an angle of 60°.

23. The method of claim 19, wherein the dry paint film has a König-hardness over 40 after 10 h and over 100 after 120 h of drying-time, measured with a pendel hardness meter.

24. The method of claim 19, wherein the adhesion of the dry paint film is >450 psi, in a PosiTest.

25. The method of claim 19, wherein a König-hardness of the dried paint film is over 40 after 10 h of drying time of the sprayed paint film.

26. A paint forming, pressurized dispersion in a sealed aerosol can, said dispersion having an extended shelf life, wherein said dispersion has been prepared with a method of claim 15 for providing a paint forming dispersion comprising a polyurethane resin and a possible epoxy resin, a polyurethane hardener precursor, ketones, possible organic solvents, pigments, paint additives, dispersion additives, propellant and providing alongside with said paint forming chemicals additionally 1-10000 ppm of free water into said sealed can, the paint forming, pressurized dispersion comprising:
 polyurethane resins selected from MDI, HDI, IPDI, TDI and phenol blocked TDI prepolymers,
 polyurethane hardener precursors selected from a group consisting of an imine, an enamine, a Mannich base, a Schiff's base, aldimine, an azole, and mixtures thereof;
 for extending the shelf life of the dispersion, the amount of the weak acid is adapted on the basis of $H_2O$ (free water) present in the can, the amount of the weak acid being in a range of 0.01-10% by weight (w/w) of the aerosol formulation, which weak acid, is selected from a group having a $pK_a$ value in a range from 1.2 to 9.9;
 additionally also temporary hydrolyzed products of said polyurethane hardener precursors and possible epoxy precursors are present in said dispersion, which hydrolyzed products, originate to the reversible reaction (2a; 2a1) or (2a; 2a2) catalyzed by said the weak acid

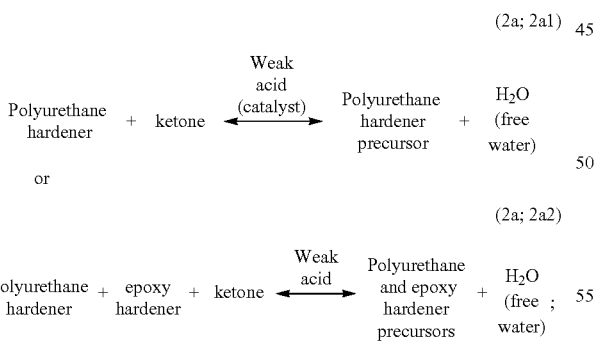

the amount of polyurethane hardener precursors and possible epoxy hardener precursor, polyurethane resin, possible epoxy resin, free water, ketones, propellant and possible organic solvent, possible pigments is at least 95% w/w from the total volume of the paint forming solution and the rest of said solution composes of the paint additives and dispersion additives.

27. The paint forming, pressurized dispersion of claim 26, wherein the paint forming dispersion is provided by admixing alongside with the polyurethane resin and polyurethane hardener precursor also epoxy resins and epoxy hardener precursors and wherein the weak acid catalyzes the reversible reaction (2a; 2a2) between the free water present in said dispersion and polyurethane and epoxy hardener precursors, wherein said epoxy hardener is a compound with amine functionality, said reaction (2a: 2a2) taking place during the entire retention time of the dispersion in the sealed can:

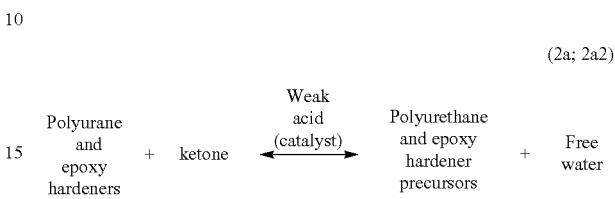

and provides the paint forming, pressurized dispersion with hydrolyzed products of said polyurethane hardener precursors and epoxy hardener precursors.

28. The paint forming, pressurized dispersion of claim 26, wherein the amount of solid water scavengers which may be filling materials and/or matt forming agents is below 1% (w/w) in said paint forming solution; wherein said water scavengers are selected from a group comprising zeolite, calcium carbide, activated carbon, silica, activated alumina, $CaSO_4$ or CaO, metal alkoxides, clay.

29. The paint forming, pressurized dispersion of claim 26 in a sealed aerosol can, which dispersion, further contains:
 (a) polyurethane resin selected from a group of polyurethane prepolymers which comprises MDI, HDI, TDI IPDI and phenol blocked TDI prepolymers;
 (b) polyurethane resin hardener precursor 1-5% w/w;
 (c) organic solvent 10-50% w/w containing ketones;
 (d) propellant, especially DME 20-50% w/w,
 (e) color or primer pigments up to 15%;
 (f) additives up to 5 w/w;
 (g) ammoniumcarboxylates and/or carbinolamines formed by hydrolysis of said polyurethane hardener precursors;
 (h) free water 0.01-1% w/w;
 (i) weak acid 0.1-10% w/w; and
 wherein the amount of compounds (a)-(e), (i) adds up to 95% of the total volume of the paint forming solution and the rest of the solution composes of (f) additives and (h) free water.

30. The paint forming, pressurized dispersion of claim 29, wherein said dispersion further comprising:
 (j) epoxy resin 1-5 w/w; and
 (k) epoxy resin hardener precursors 1-5% w/w.

31. The paint forming, pressurized dispersion of claim 30, wherein the polyurethane and epoxy hardener precursor is an oxazole.

32. The paint forming, pressurized dispersion of claim 26, wherein the imine is a reaction product of ethylenediamine and methyl isobutyl ketone; diethyl ketone-based di-imine; or mixtures thereof.

33. The paint forming, pressurized dispersion of claim 26, wherein the enamine is a reaction product of 3,3,5-trimethylcyclohexanone with secondary diamines; a reaction product of isophoronediamine and methyl isobutyl ketone; or N,N, bis(1,3-dimethylbutylidine)ethylenediamine.

34. The paint forming, pressurized dispersion of claim 26, wherein the Mannich base is dimethylaminomethylphenol.

35. The paint forming, pressurized dispersion of claim 26, wherein the aldimine is 3-oxazolidineethanol, 2-(1-methylethyl)-, 3,3-carbonate or N-butyl-2-(1-ethyl-pentyl)-1,3-oxazolidine.

36. The paint forming, pressurized dispersion of claim 29, wherein the solution further comprises at least one organic solvent, which is ketone.

37. The paint forming, pressurized dispersion of claim 26 and a sprayed dry paint film, formed by spraying the paint forming solution out from the can to form a dry paint film on the target surface, wherein the amount of matting agents (solid water scavengers) in polyurethane paint forming dispersion is such, that in a case paint surface to be made has a high gloss (gloss 70-100), matting agent is added 0% w/w, in a case paint surface to be made has a medium gloss (gloss 30-69), matting agent is added 0.1-0.5 w/w %, and in a case paint surface to be made has a low gloss (gloss 5-29), matting agent is added 0.5-1% w/w.

38. The paint forming, pressurized dispersion of claim 37, wherein the dry paint film has a König-hardness over 40 after 10 h and over 100 after 120 h of drying-time, measured with a pendel hardness meter.

* * * * *